United States Patent
Duginske

(10) Patent No.: US 11,529,690 B2
(45) Date of Patent: Dec. 20, 2022

(54) MITER BAR POCKET HOLE JIG SYSTEMS AND METHODS

(71) Applicant: Mark A. Duginske, Merrill, WI (US)

(72) Inventor: Mark A. Duginske, Merrill, WI (US)

( * ) Notice: Subject to any disclaimer, the term of this patent is extended or adjusted under 35 U.S.C. 154(b) by 0 days.

(21) Appl. No.: 17/321,118

(22) Filed: May 14, 2021

(65) Prior Publication Data
US 2021/0354207 A1 Nov. 18, 2021

Related U.S. Application Data

(60) Provisional application No. 63/025,633, filed on May 15, 2020.

(51) Int. Cl.
*B23B 47/28* (2006.01)
(52) U.S. Cl.
CPC .......... *B23B 47/287* (2013.01); *B23B 47/288* (2013.01); *B23B 2247/10* (2013.01); *B23B 2247/12* (2013.01); *B23B 2260/004* (2013.01)
(58) Field of Classification Search
CPC .......... B23B 2247/10; B23B 2260/088; B23B 2260/004; B23B 2247/12; B23B 47/288; B23B 47/287; B27B 27/08; B27B 27/10
See application file for complete search history.

(56) References Cited

U.S. PATENT DOCUMENTS

| | | |
|---|---|---|
| 2,409,921 A | 10/1946 | Wulff |
| 2,838,966 A | 6/1958 | Campbell |
| 2,966,080 A | 12/1960 | Atols |
| 3,589,230 A | 6/1971 | Neuman |
| 3,964,360 A | 6/1976 | Schwartz |
| 4,145,160 A | 3/1979 | Wiggins |
| 4,449,867 A | 5/1984 | Dergo |
| 4,476,757 A | 10/1984 | Morris |
| 4,693,158 A | 9/1987 | Price |
| 4,920,846 A | 5/1990 | Duginske et al. |
| 4,924,633 A | 5/1990 | Hock et al. |
| 4,955,766 A | 9/1990 | Sommerfeld |
| 5,018,912 A | 5/1991 | Reitz |
| 5,038,486 A | 8/1991 | Ducate, Sr. |
| 5,107,601 A | 4/1992 | Semchuck |
| 5,275,074 A * | 1/1994 | Taylor ............... B23Q 1/28 403/297 |
| 5,337,641 A | 8/1994 | Duginske |
| 5,353,515 A * | 10/1994 | Alvis ............... B27B 27/04 33/464 |
| 5,398,740 A | 3/1995 | Miller |

(Continued)

FOREIGN PATENT DOCUMENTS

WO 2012165977 A1 12/2012

OTHER PUBLICATIONS

ABZ Woodshop, Shaker Bench Project, Copyright 2014 Mark Duginske & Jon Drew, 15 pages.

(Continued)

*Primary Examiner* — Eric A. Gates
*Assistant Examiner* — Paul M Janeski
(74) *Attorney, Agent, or Firm* — Quarles & Brady LLP

(57) ABSTRACT

Jigs, fixtures, accessories, and the like for locating, aligning, guiding, engaging, and/or holding a workpiece on a woodworking machinery during a woodworking operation are described, as well as methods of making, modifying, and using jigs, fixtures, and accessories.

19 Claims, 18 Drawing Sheets

(56) References Cited

U.S. PATENT DOCUMENTS

| | | |
|---|---|---|
| 5,423,360 A | 6/1995 | Taylor et al. |
| 5,443,554 A | 8/1995 | Robert |
| 5,490,665 A | 2/1996 | Thiele et al. |
| 5,493,789 A | 2/1996 | Duginske |
| 5,547,305 A | 8/1996 | Treche |
| 5,595,378 A | 1/1997 | Martinsson et al. |
| 5,617,909 A | 4/1997 | Duginske |
| 5,666,737 A | 9/1997 | Ryan, III |
| 5,676,000 A | 10/1997 | Chen |
| 5,716,045 A | 2/1998 | Taylor |
| 5,735,054 A | 4/1998 | Cole |
| 5,768,966 A | 6/1998 | Duginske |
| 5,787,781 A | 8/1998 | Hile |
| 5,813,803 A | 9/1998 | Sommerfeld |
| 5,845,555 A | 12/1998 | Dawley |
| 6,000,688 A | 12/1999 | Giangrasso |
| 6,237,457 B1 | 5/2001 | Taylor |
| 6,240,822 B1 | 6/2001 | Musser |
| 6,481,936 B1 | 11/2002 | Hecht |
| 6,499,224 B1 | 12/2002 | Asick |
| 6,502,492 B1 * | 1/2003 | Krohmer ............ B27B 25/10 33/471 |
| D471,925 S | 3/2003 | Duginske |
| 6,557,601 B1 | 5/2003 | Taylor |
| 6,599,064 B1 | 7/2003 | Robinson |
| 6,622,997 B2 | 9/2003 | Emerson |
| 6,880,442 B2 | 4/2005 | Duginske |
| 6,910,592 B1 | 6/2005 | Lindenmeyer |
| 7,127,976 B1 | 10/2006 | Fitzsimmons |
| 7,464,737 B2 | 12/2008 | Duginske |
| 7,641,425 B2 * | 1/2010 | Sommerfeld ......... B23B 47/287 408/115 R |
| 7,726,411 B2 | 6/2010 | McSheffrey, Jr. et al. |
| 7,798,187 B1 | 9/2010 | Duginske |
| 7,930,960 B2 | 4/2011 | Duginske |
| 8,083,443 B1 | 12/2011 | Circosta et al. |
| 8,231,313 B2 | 7/2012 | Sommerfeld et al. |
| 8,424,434 B2 | 4/2013 | Koegel et al. |
| 8,684,052 B2 | 4/2014 | Breitenbach |
| 8,840,345 B1 | 9/2014 | Park |
| 9,056,402 B2 | 6/2015 | Clark |
| 9,381,621 B2 | 7/2016 | Taylor et al. |
| 9,670,949 B1 | 6/2017 | White et al. |
| 9,757,842 B2 | 9/2017 | Huelsmann |
| 9,895,756 B2 | 2/2018 | Fiala |
| 9,969,042 B2 | 5/2018 | Clark |
| 10,144,068 B1 | 12/2018 | Poole et al. |
| 10,253,922 B1 | 4/2019 | Yidong |
| 10,357,893 B1 | 7/2019 | Frolov et al. |
| 10,399,152 B2 * | 9/2019 | Chang ............ B23B 47/287 |
| 10,646,933 B2 | 5/2020 | Duginske |
| 11,020,808 B2 | 6/2021 | Duginske |
| 11,084,106 B2 | 8/2021 | Duginske |
| 11,331,785 B2 | 5/2022 | Holderle |
| 2001/0047706 A1 | 12/2001 | Parks et al. |
| 2002/0104417 A1 | 8/2002 | Chen |
| 2002/0150434 A1 | 10/2002 | Sommerfeld et al. |
| 2003/0051768 A1 | 3/2003 | Jukoff et al. |
| 2003/0056631 A1 | 3/2003 | Duginske |
| 2004/0065387 A1 | 4/2004 | Smith |
| 2005/0056345 A1 | 3/2005 | Duginske |
| 2005/0115376 A1 | 6/2005 | Jimenez |
| 2005/0241450 A1 | 11/2005 | Schwartz |
| 2005/0279200 A1 | 12/2005 | Duginske |
| 2006/0027713 A1 | 2/2006 | van Walraven |
| 2006/0191122 A1 | 8/2006 | Collins |
| 2006/0201298 A1 | 9/2006 | Smith |
| 2006/0228180 A1 | 10/2006 | Sommerfeld et al. |
| 2006/0233620 A1 | 10/2006 | Herrick |
| 2006/0248998 A1 | 11/2006 | Duginske |
| 2007/0280795 A1 | 12/2007 | McDaniel et al. |
| 2008/0115643 A1 | 5/2008 | Hwang |
| 2009/0053003 A1 | 2/2009 | Clark |
| 2011/0192497 A1 | 8/2011 | Clark |
| 2014/0026725 A1 | 1/2014 | Makropoulos |
| 2014/0197589 A1 | 7/2014 | Ducek et al. |
| 2014/0341665 A1 | 11/2014 | Clark |
| 2015/0298217 A1 | 10/2015 | Clark et al. |
| 2017/0087644 A1 | 3/2017 | Pelkey |
| 2017/0100782 A1 | 4/2017 | Pedersen |
| 2018/0185930 A1 | 7/2018 | Duginske |
| 2019/0270143 A1 * | 9/2019 | Duginske ............ B27B 27/10 |

OTHER PUBLICATIONS

Duginske, Basic Cabinetmaking, Copyright 2005 Mark Duginske, 40 pages.
Kreg, Kreg Jig Support Stop Assembly and Instructions, Version 2005701, 2 pages.
Kreg, Quick-Start Guide, Rev C, Jun. 2010, 27 pages.
Kreg, Precision Trak & Stop Kit, KMS8000, Instructional Manual, May 2010, 3 pages.
Kreg, Kreg Jig K4 / Kreg Jig K4 Master System, Owner's Manual, Version 1, Apr. 2015, 32 pages.
Kreg, Kreg Jig K5 / Kreg Jig K5 Master System, Owner's Manual, Version 2, Nov. 2016, 40 pages.
Kreg, Solutions, vol. 32, 2016, 31 pages.
Woodpeckers, 1" Flip Stop, 1 page.
Kreg, Kreg Jig Material Support Stop Assembly and Instructions, NK9292, Version 1, Jan. 2018, 2 pages.
Kreg, Solutions, vol. 33, 2017, 64 pages.

* cited by examiner

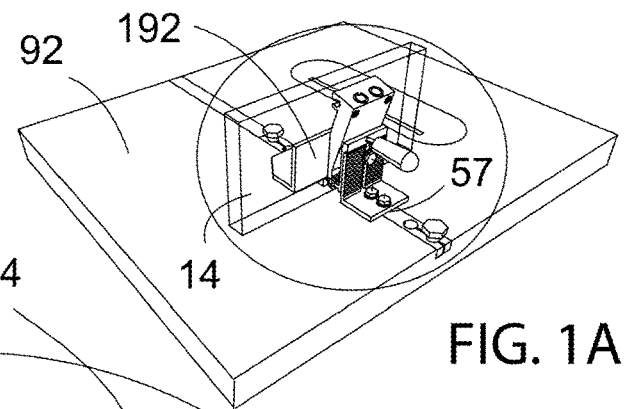
FIG. 1A
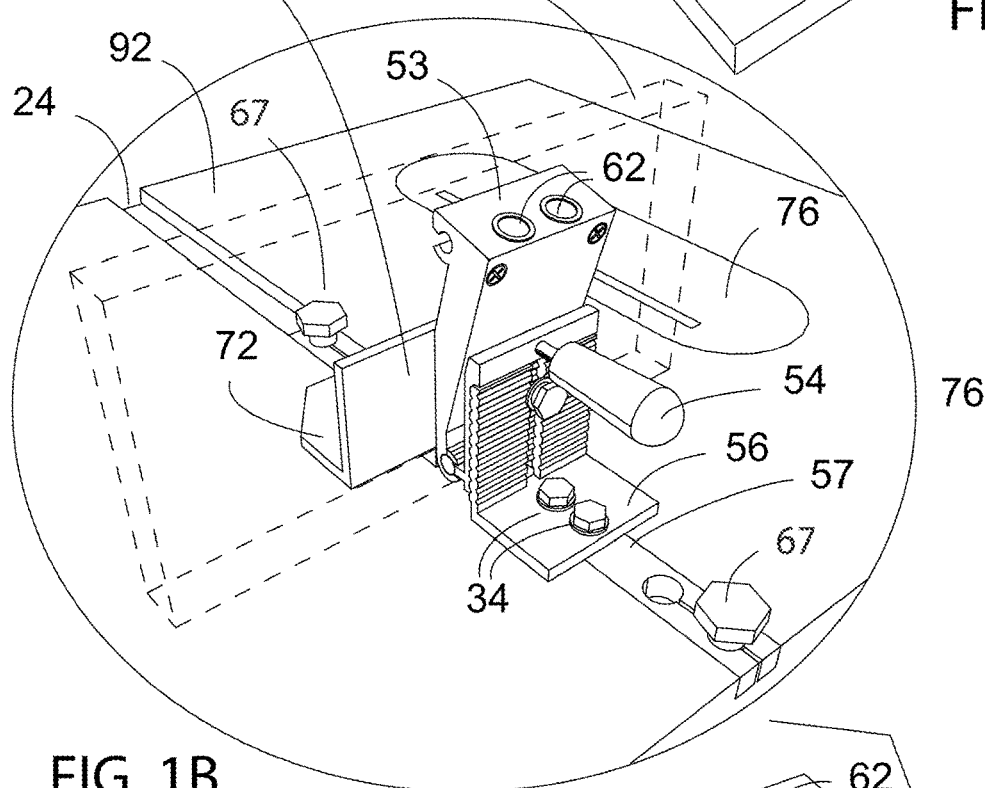
FIG. 1B
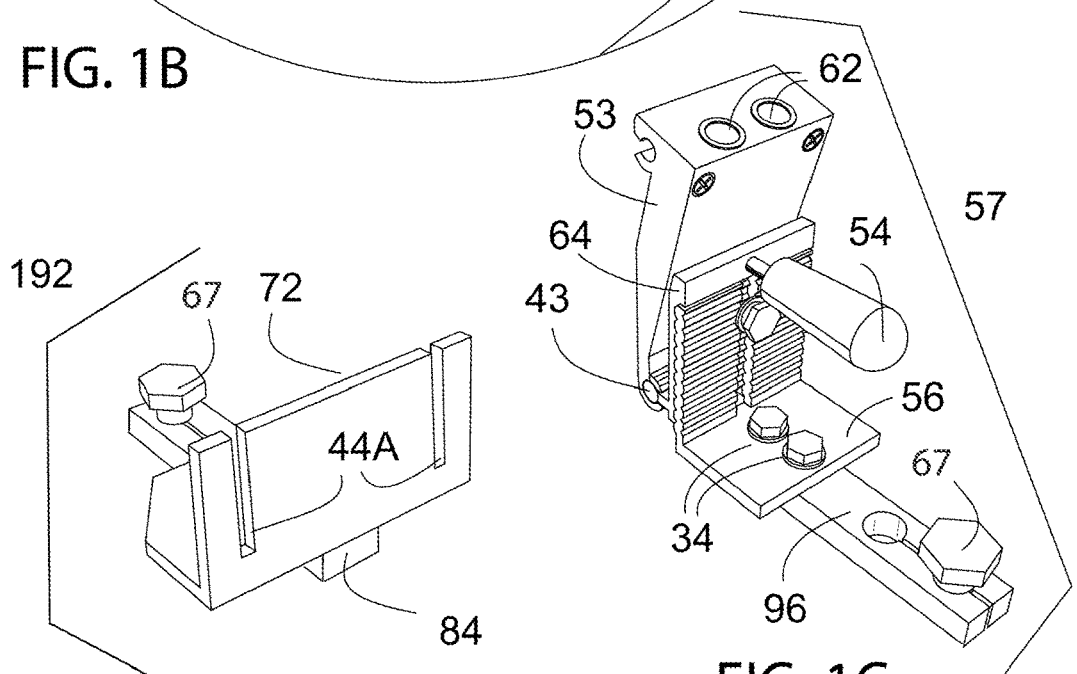
FIG. 1D
FIG. 1C

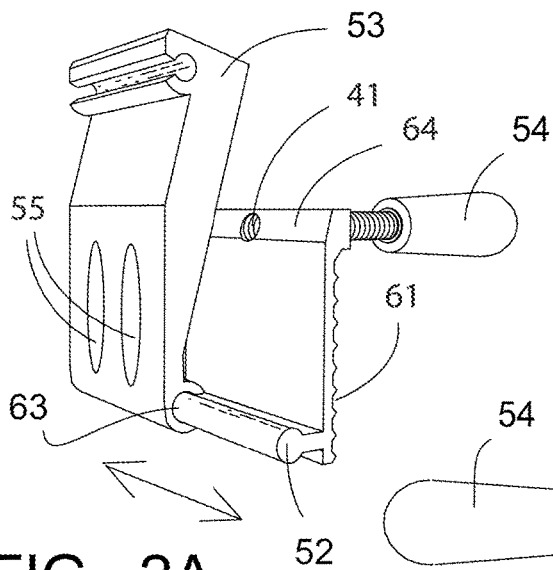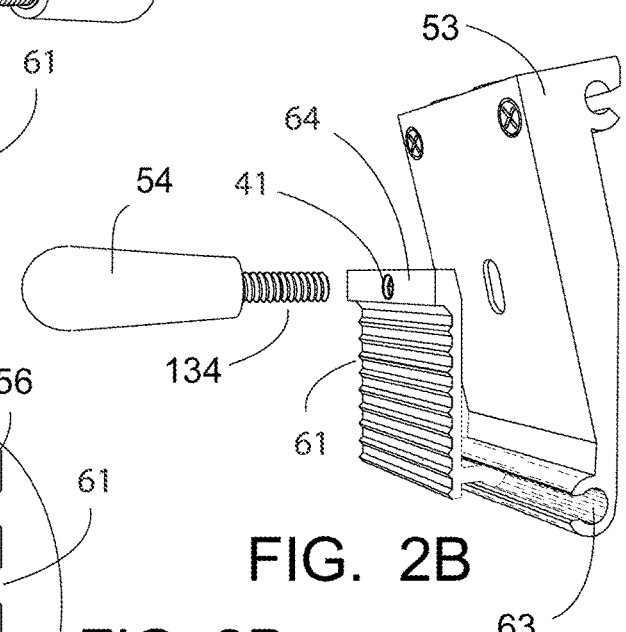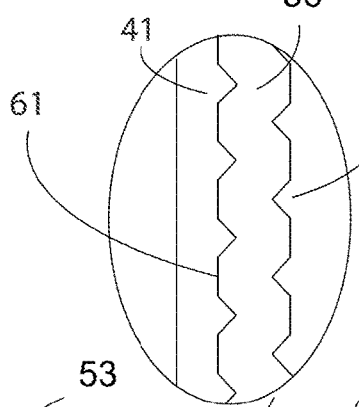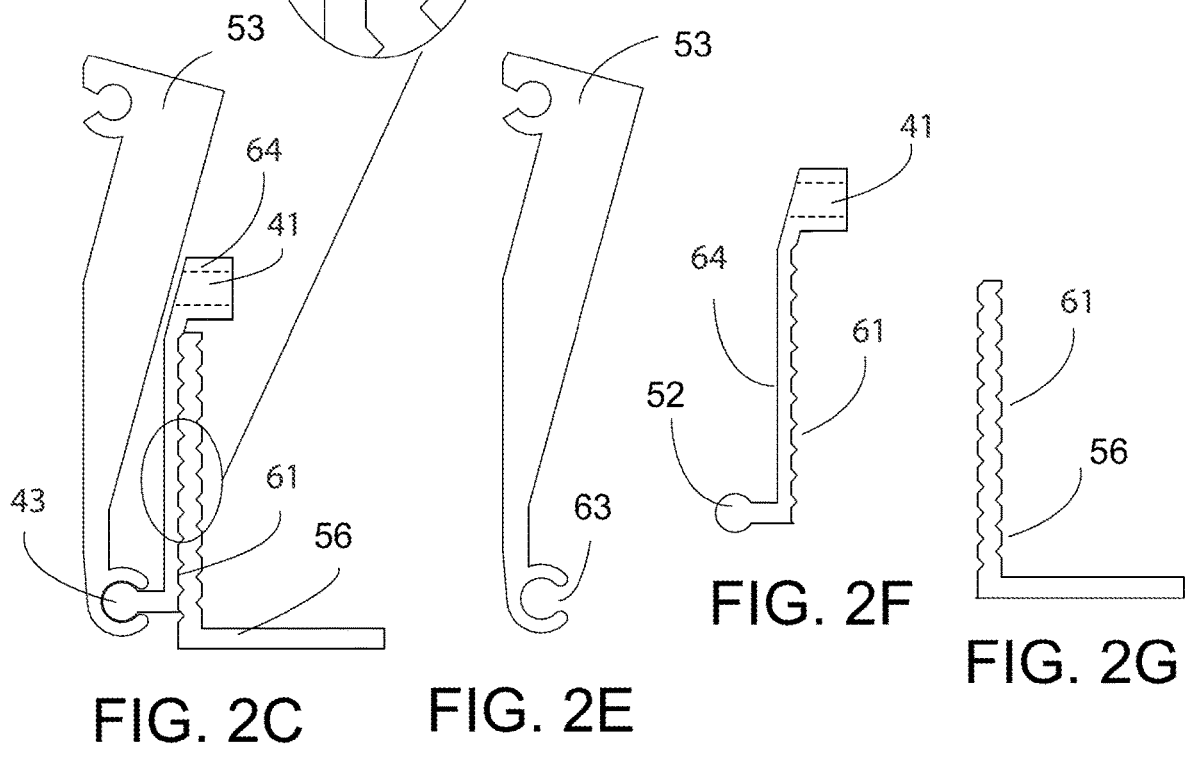

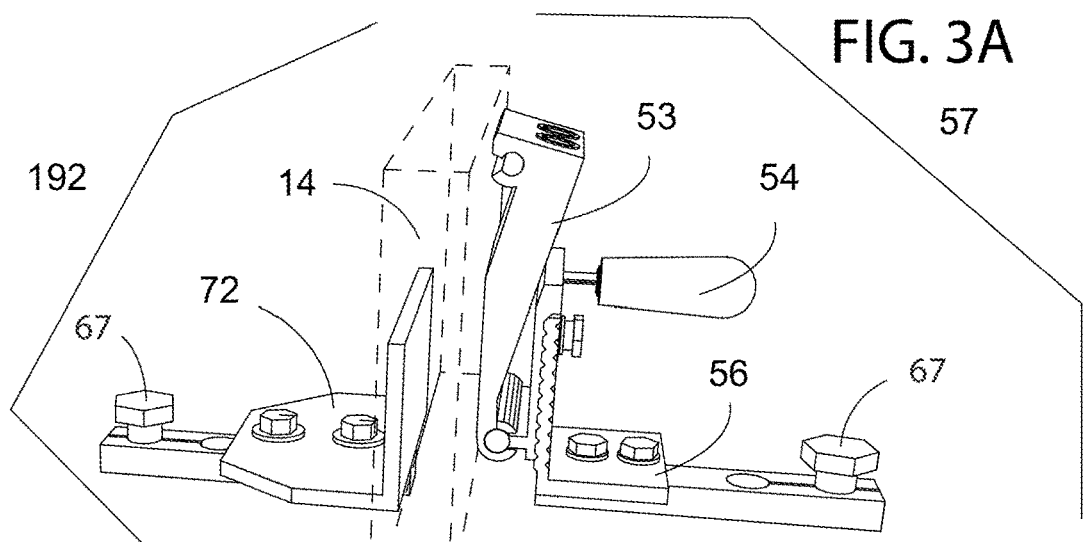
FIG. 3A
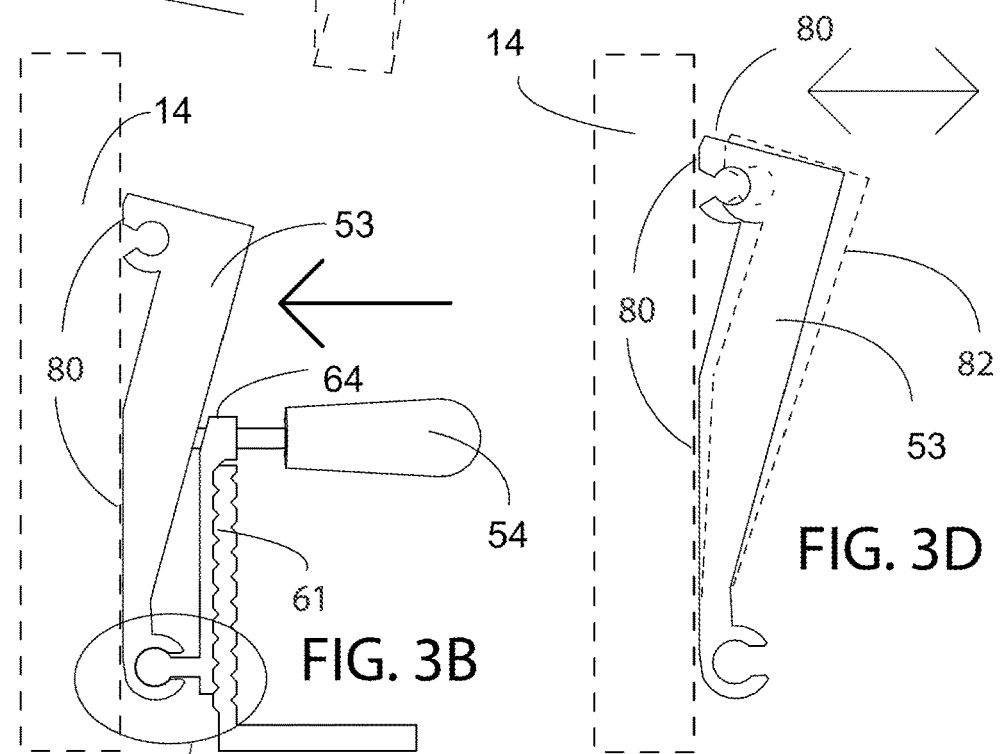
FIG. 3B
FIG. 3D
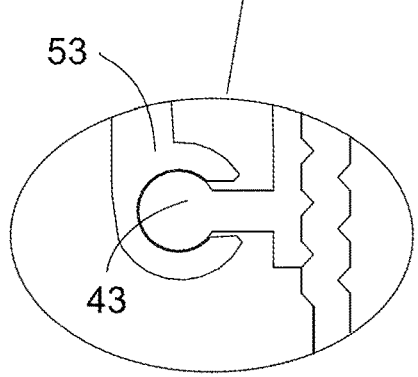
FIG. 3C
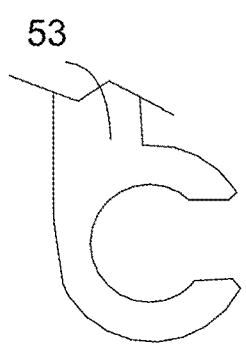
FIG. 3E
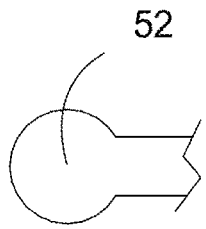
FIG. 3F

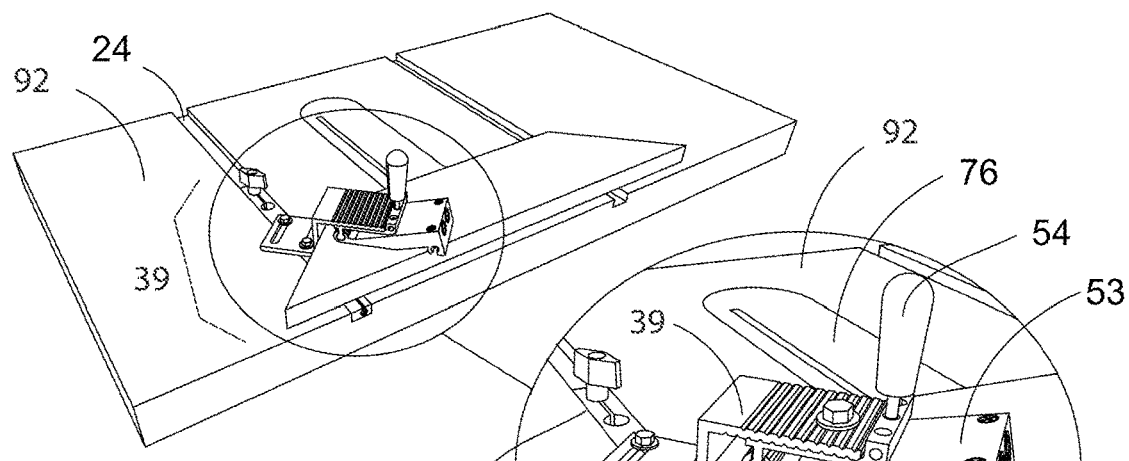
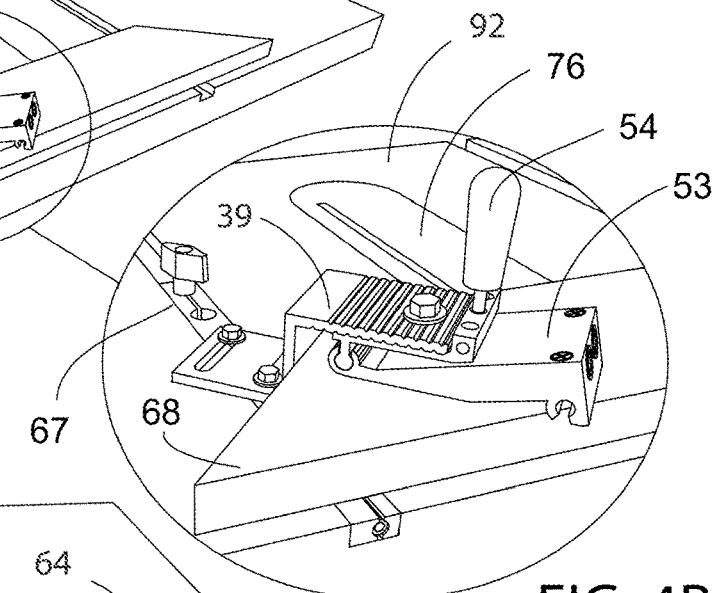
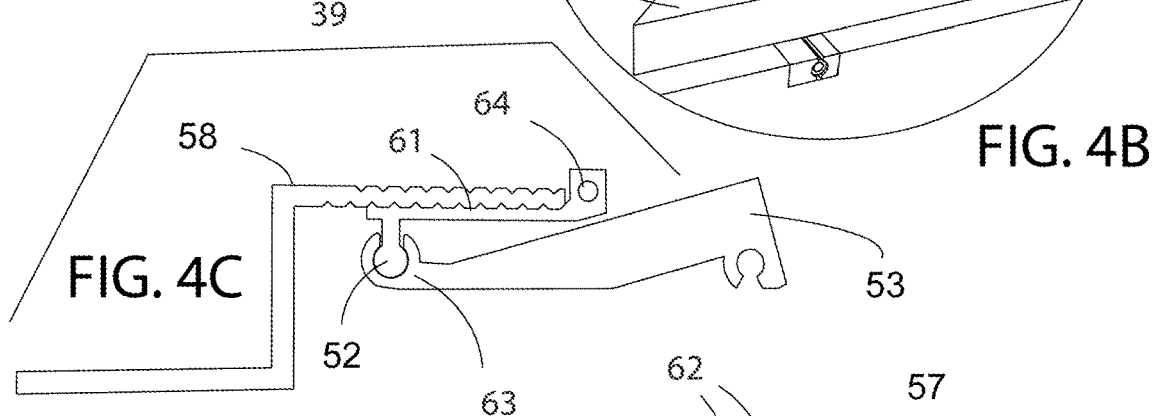
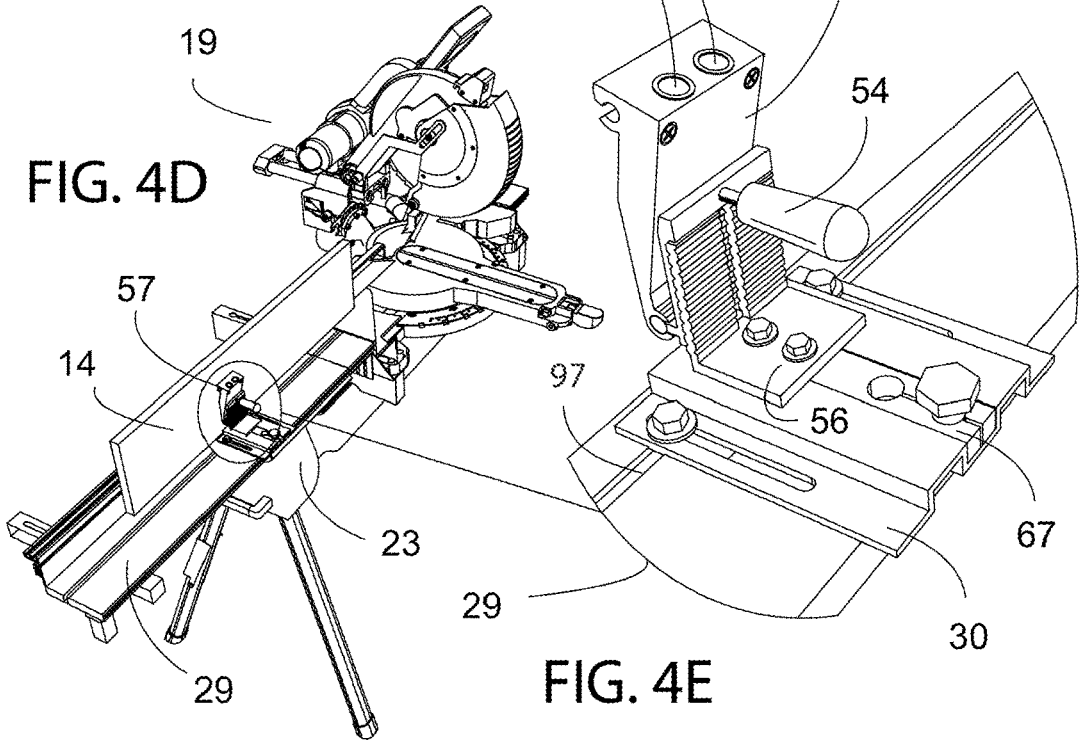

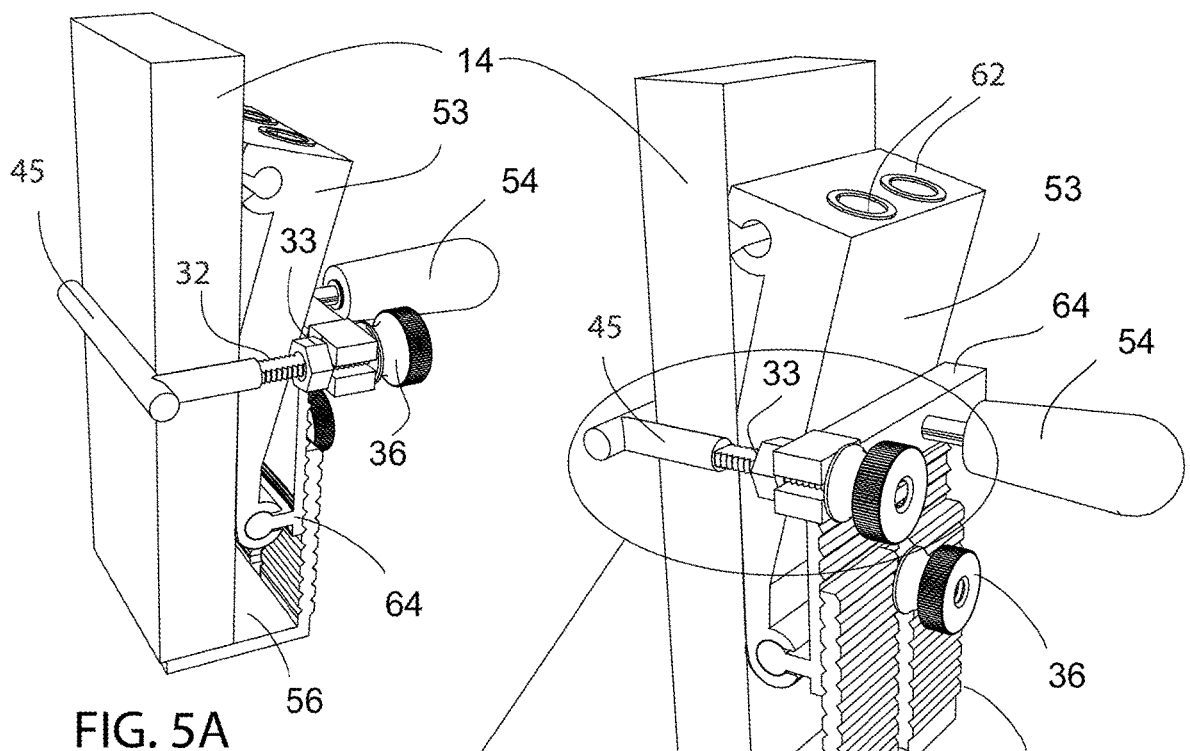
FIG. 5A
FIG. 5B
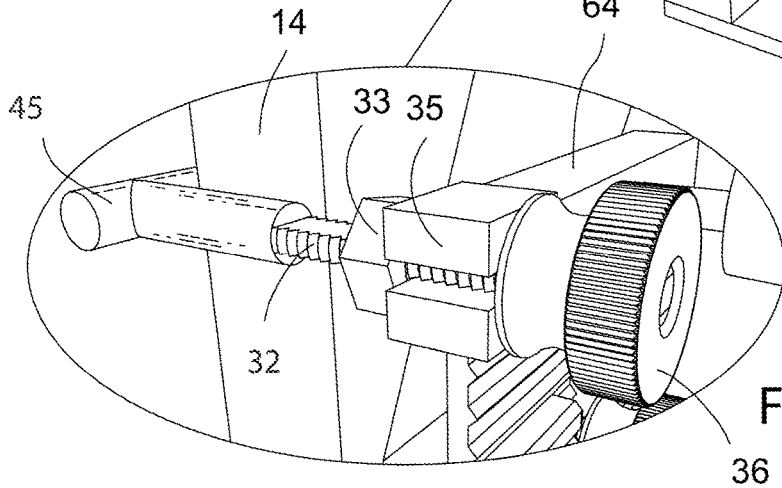
FIG. 5C
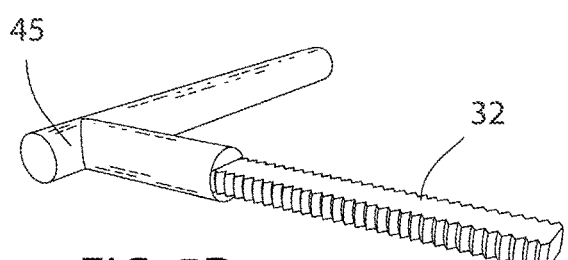
FIG. 5D
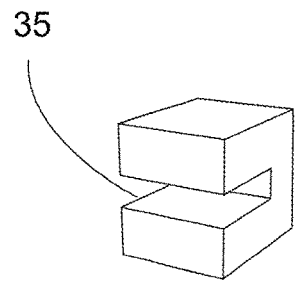
FIG. 5E

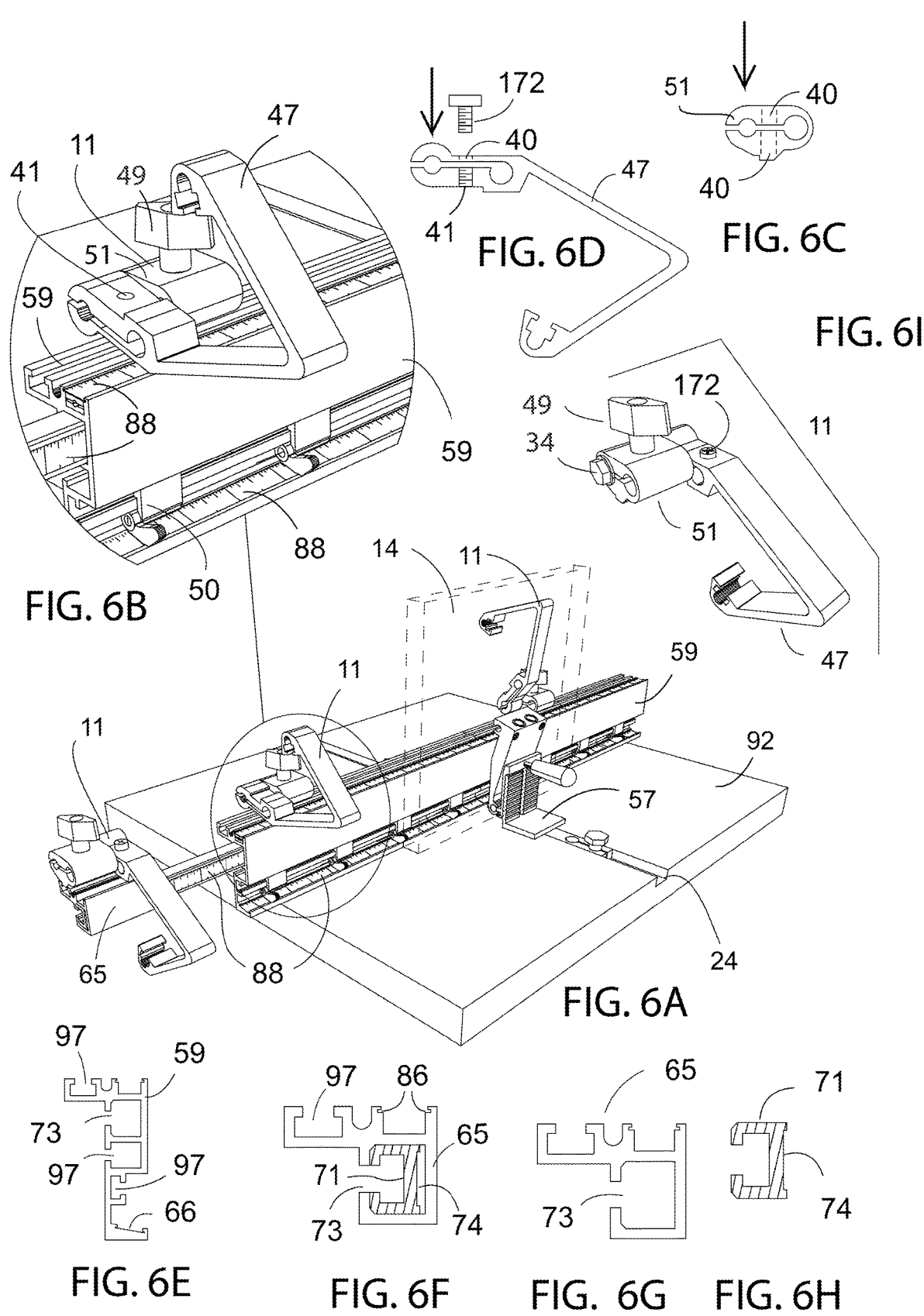

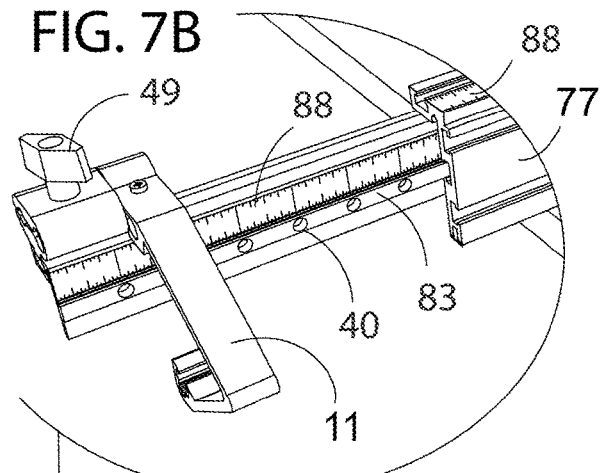
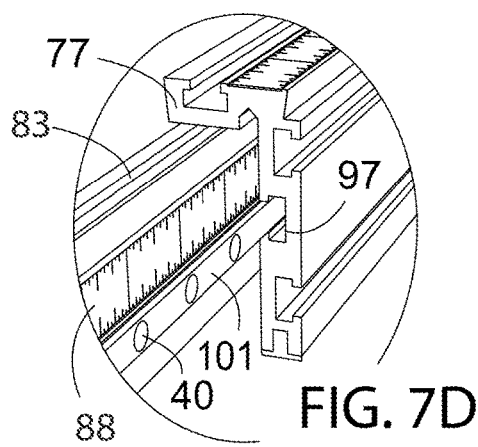
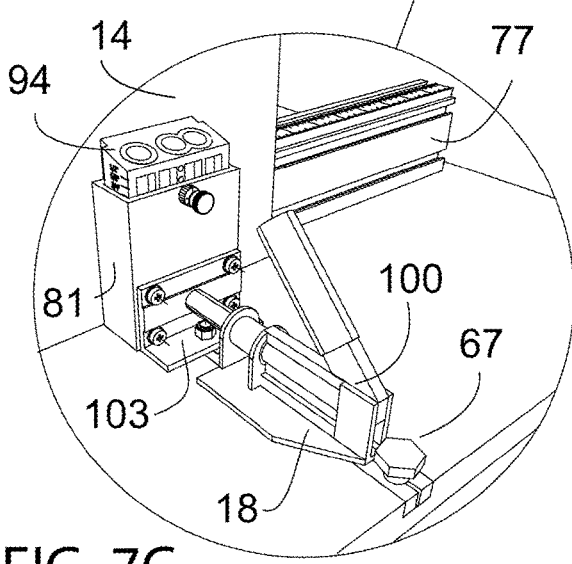
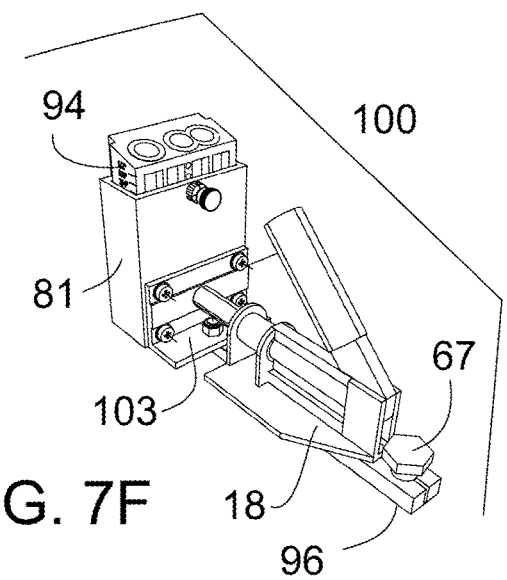

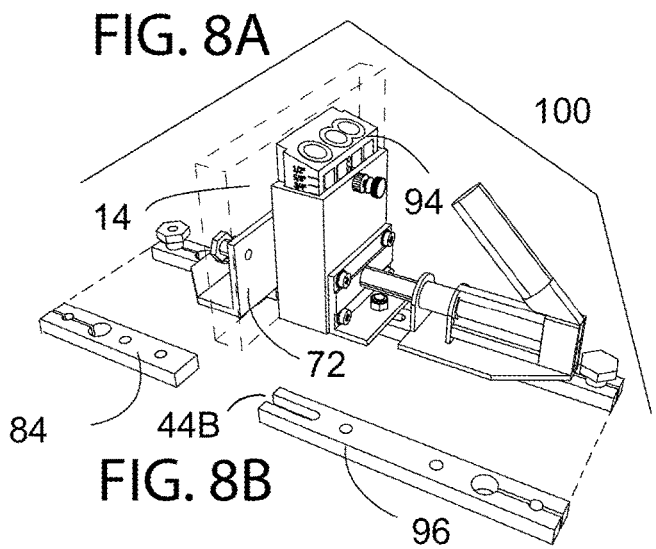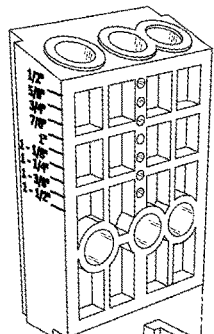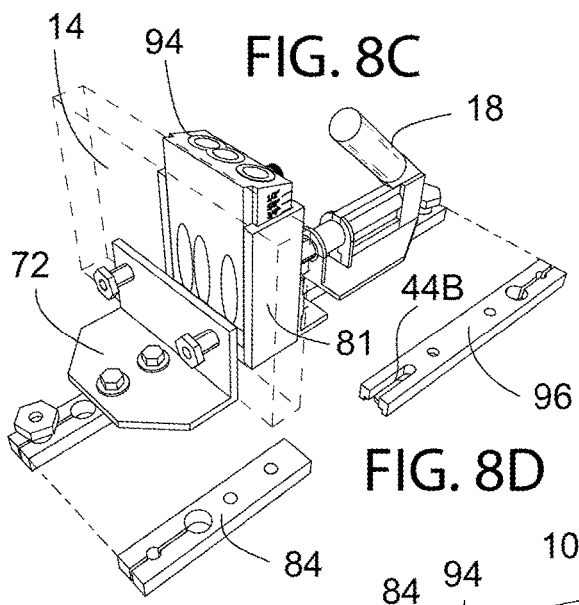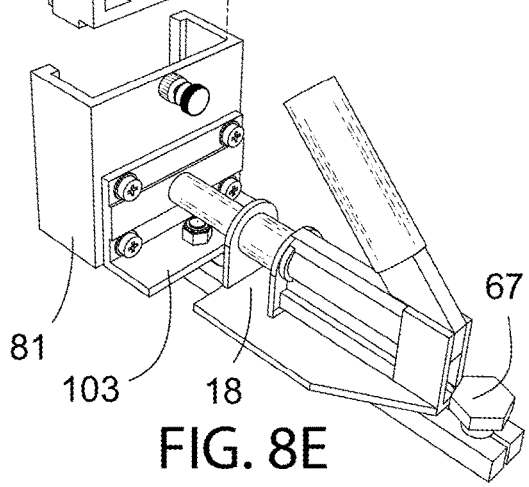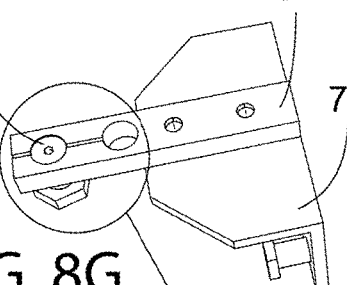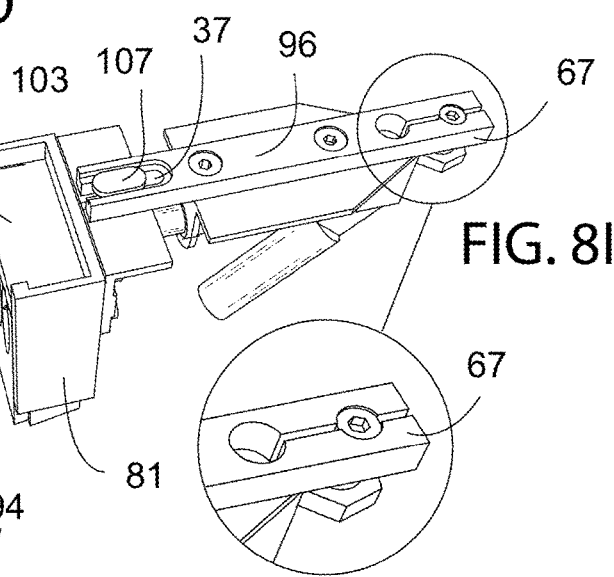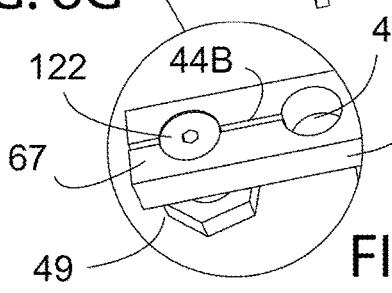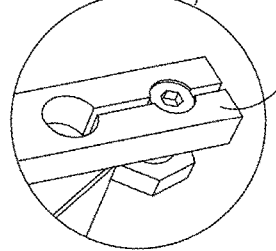

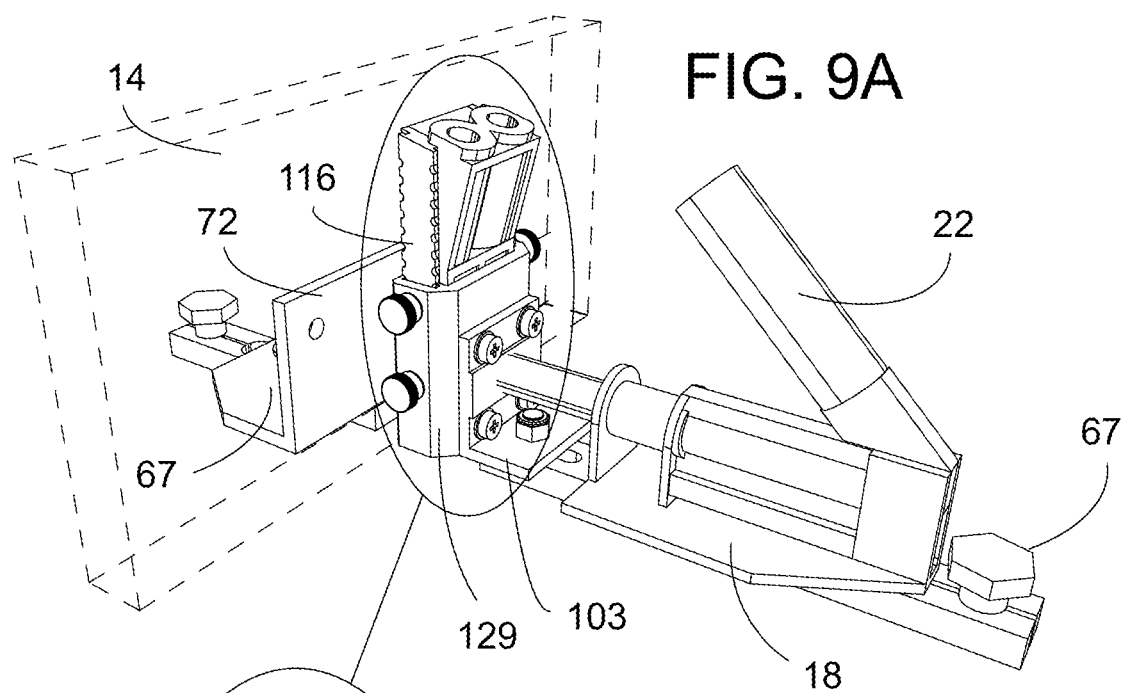
FIG. 9A
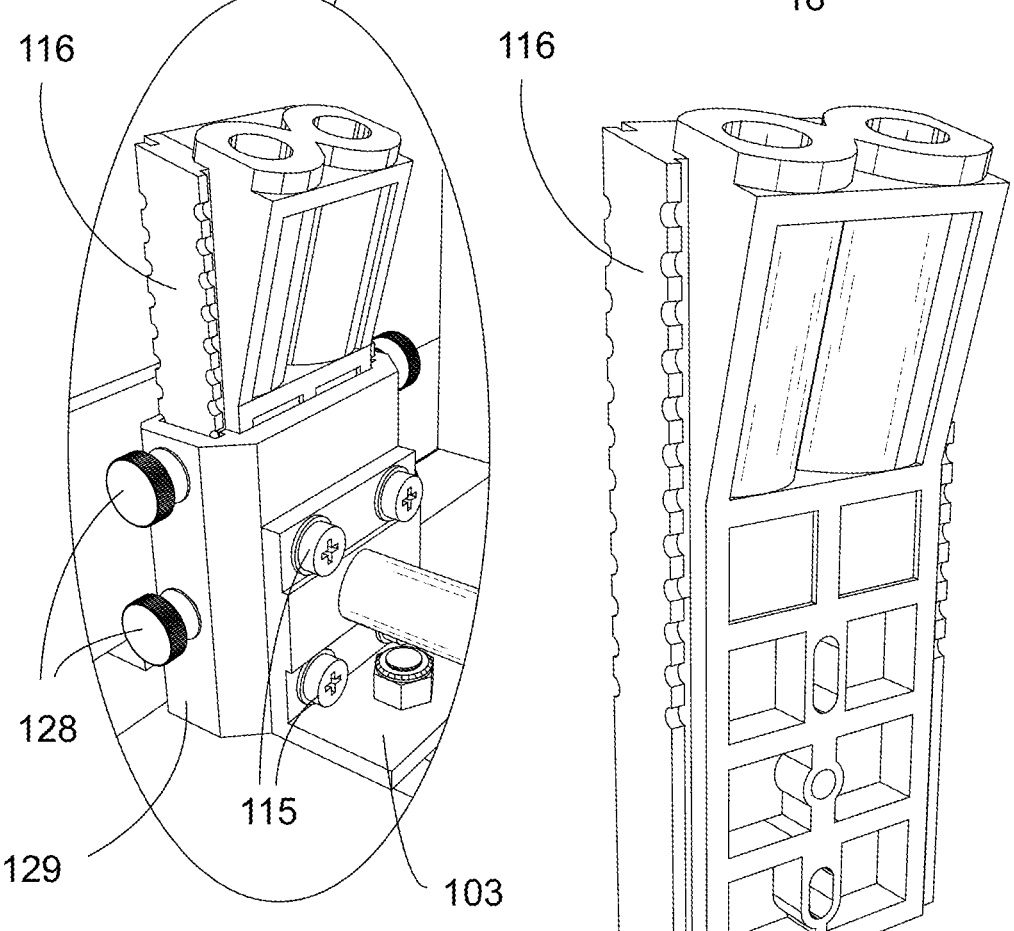
FIG. 9B
FIG. 9C

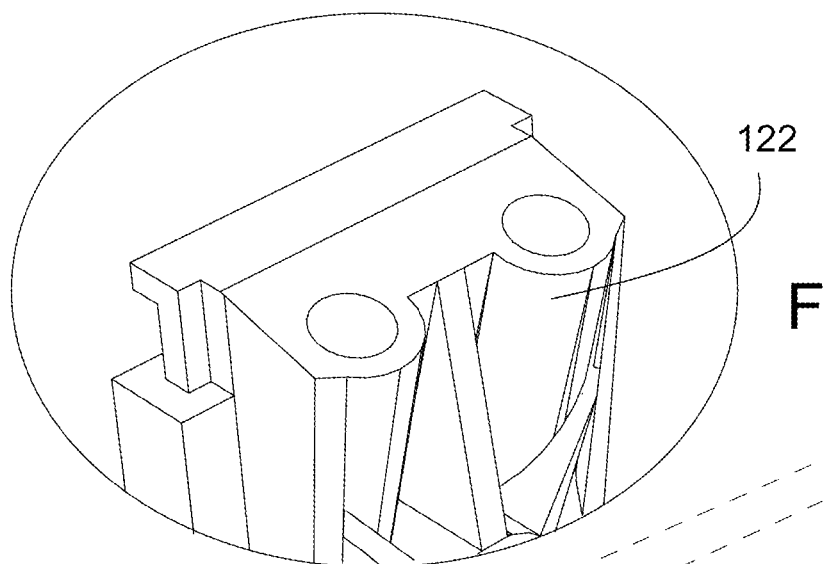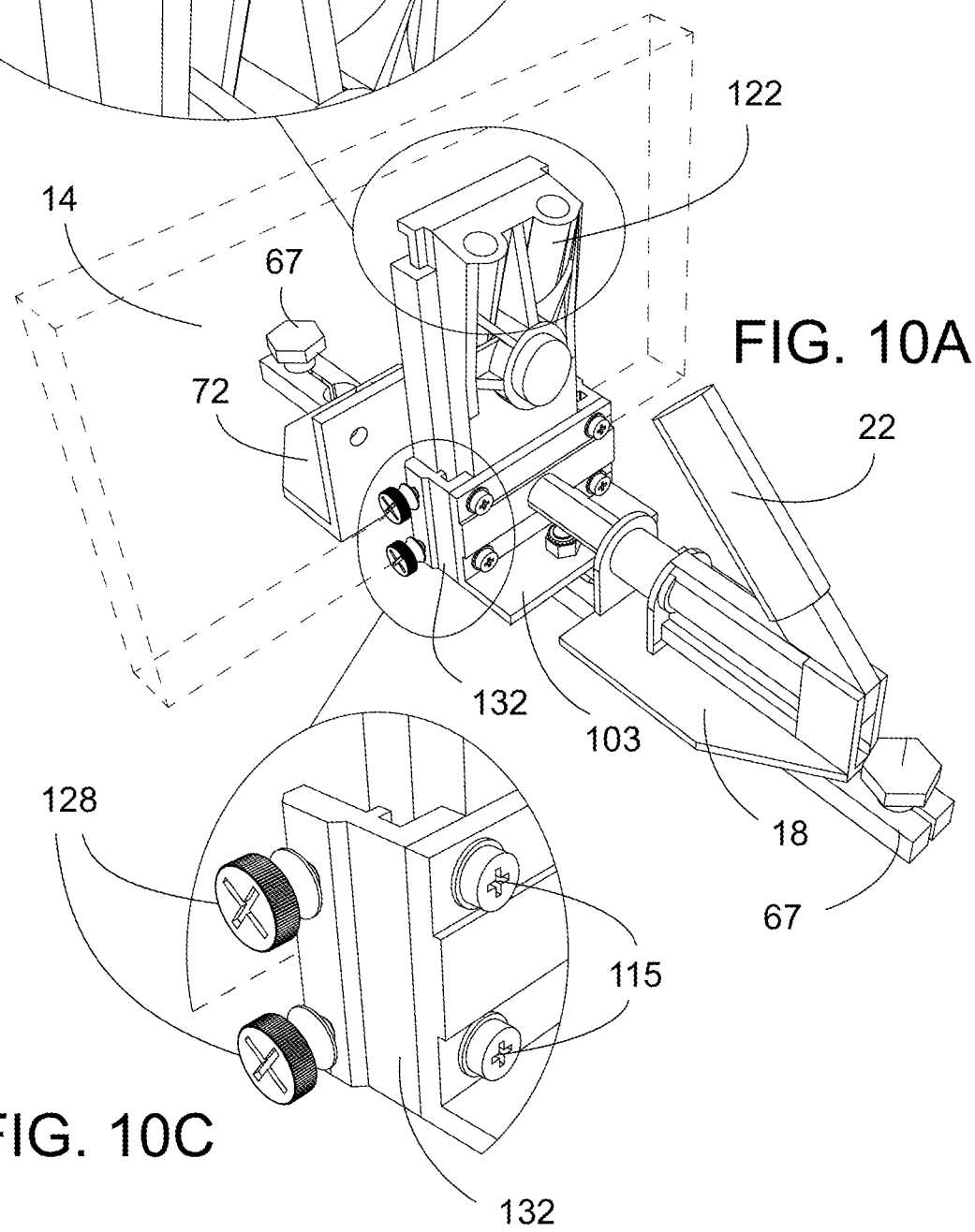

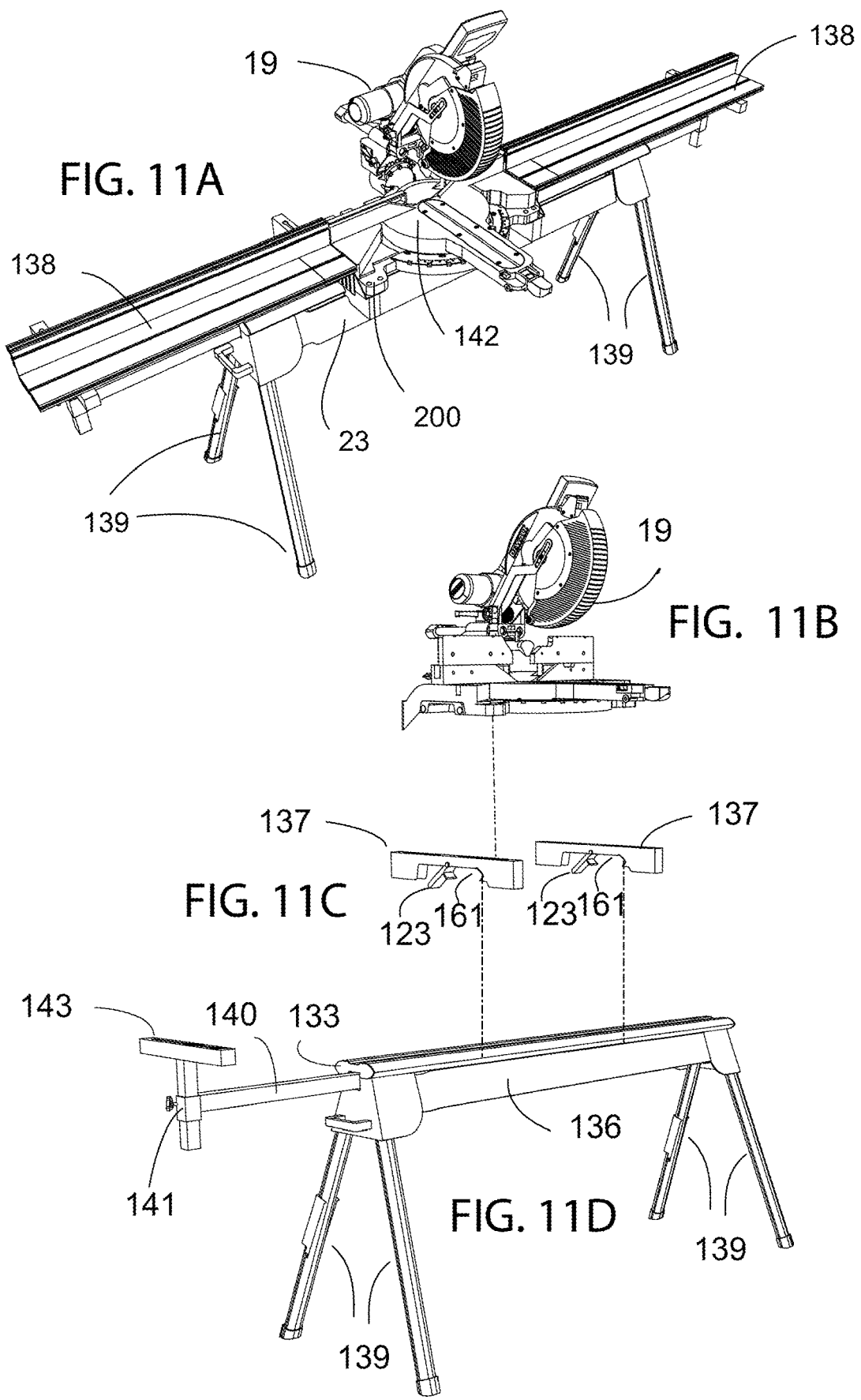

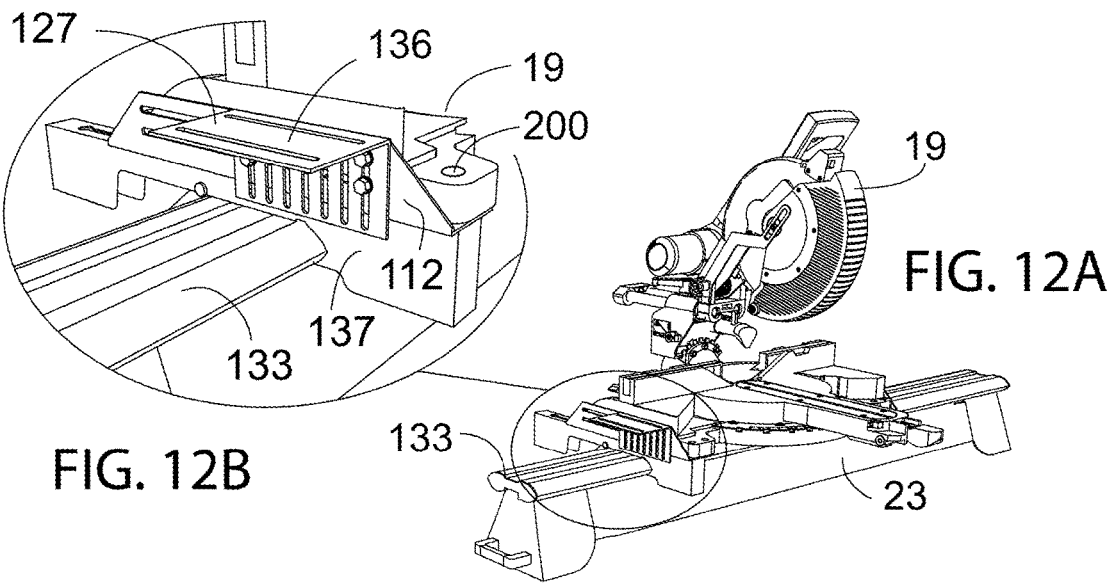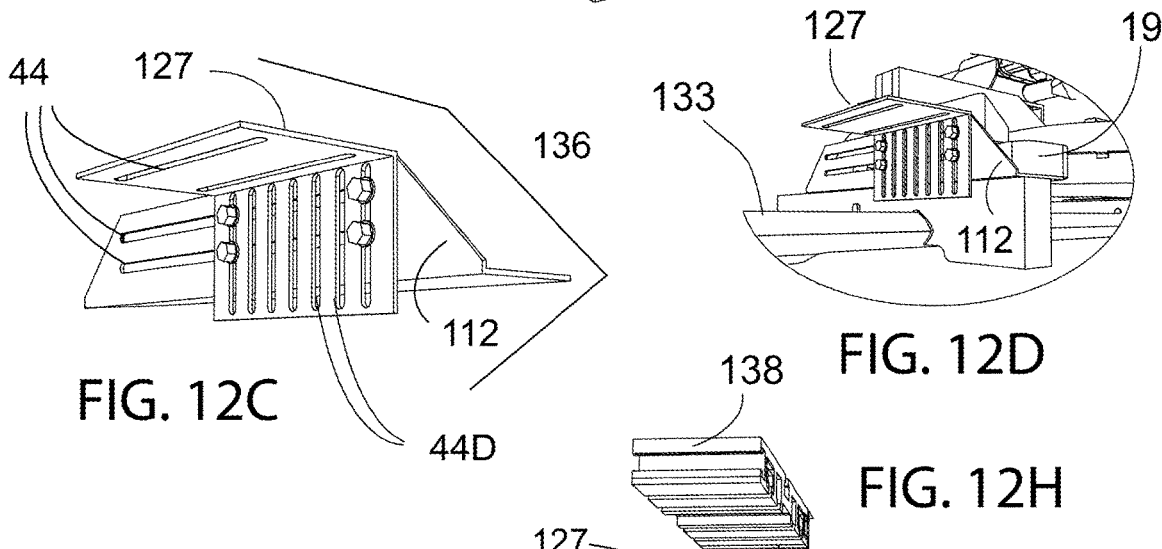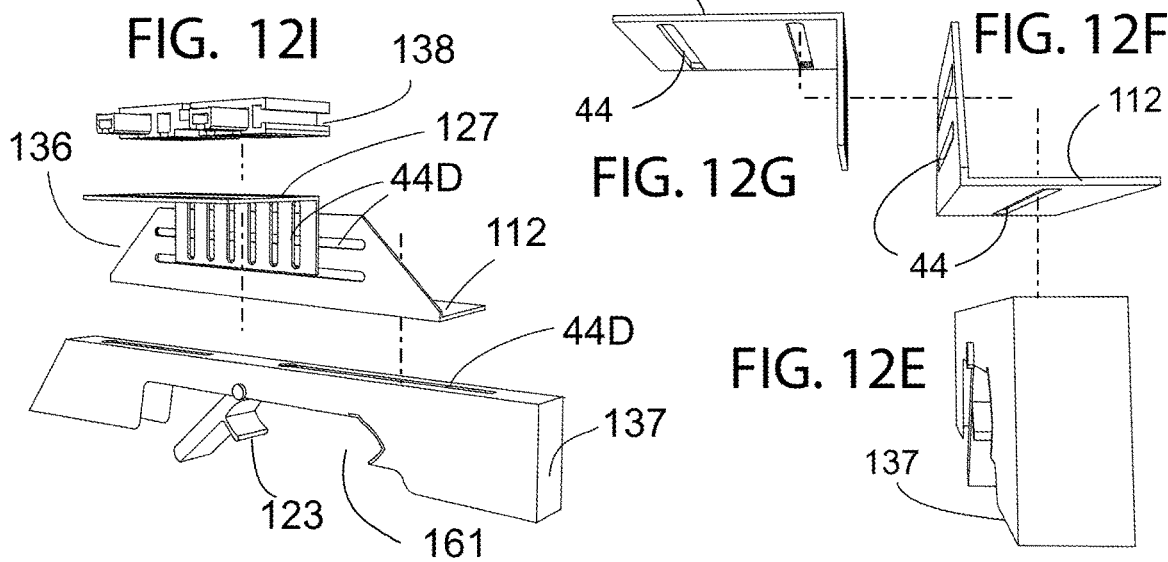

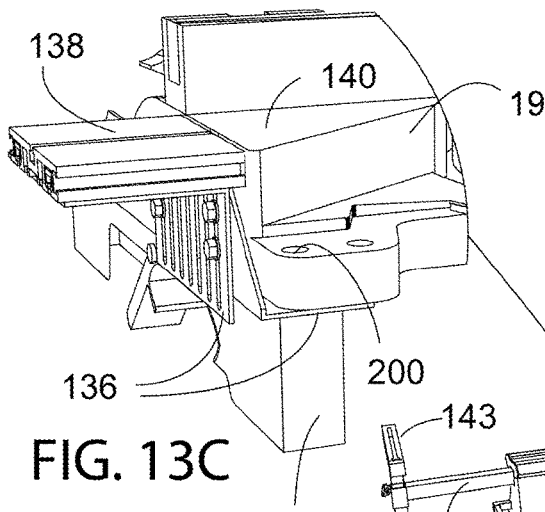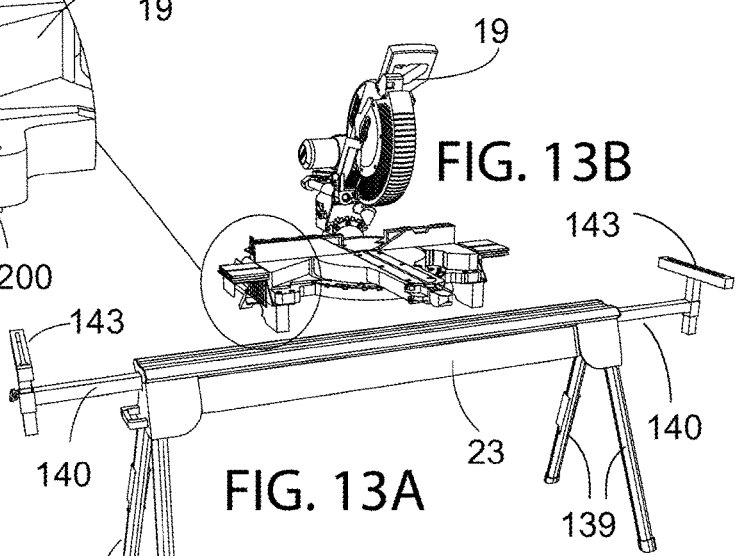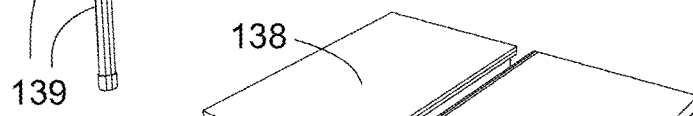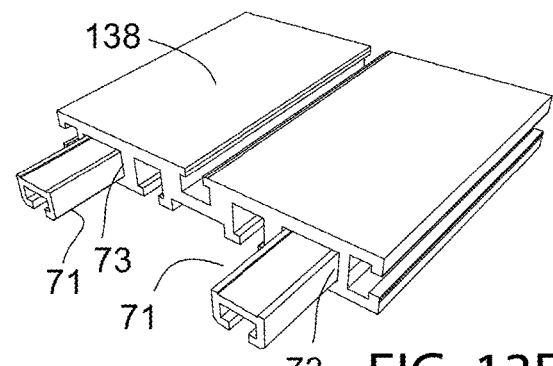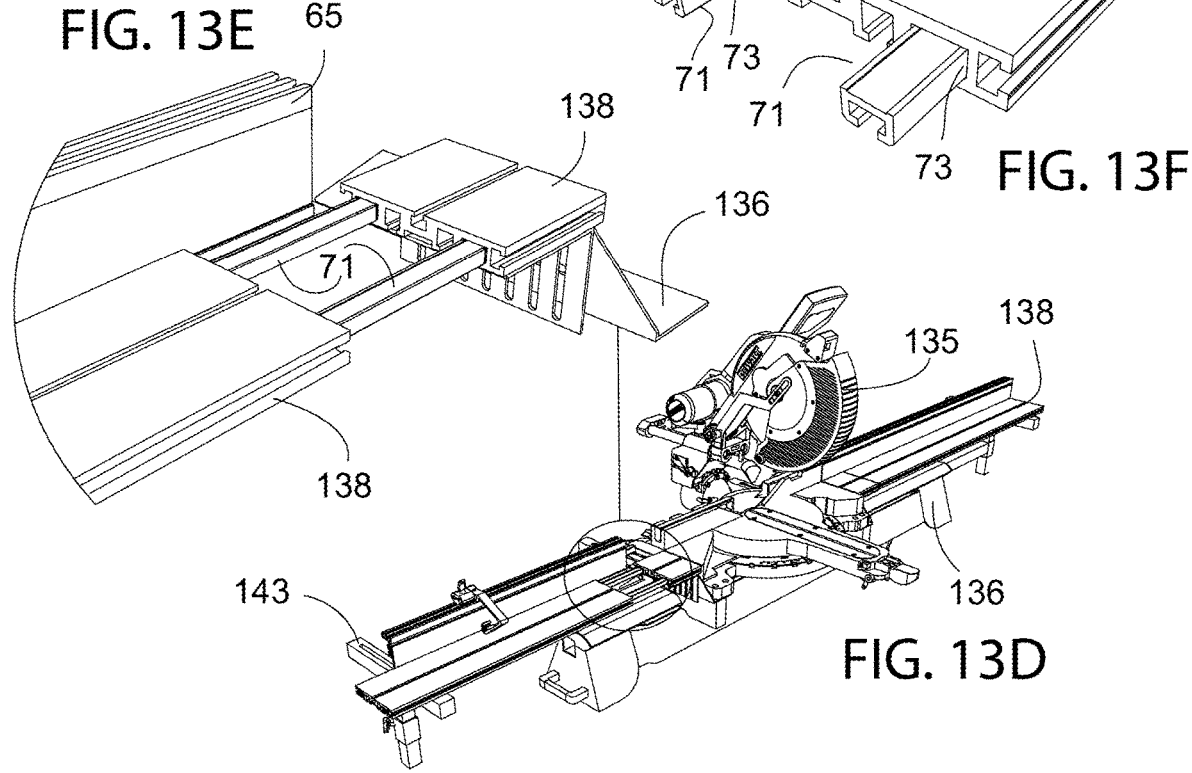

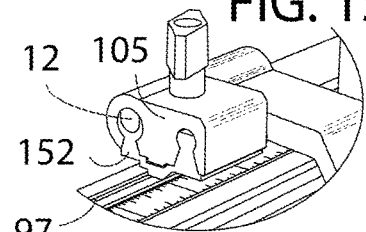
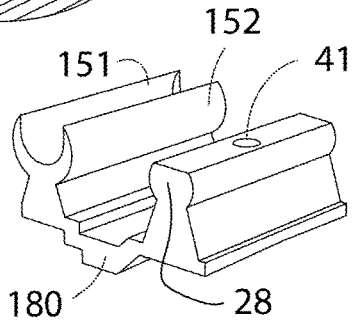
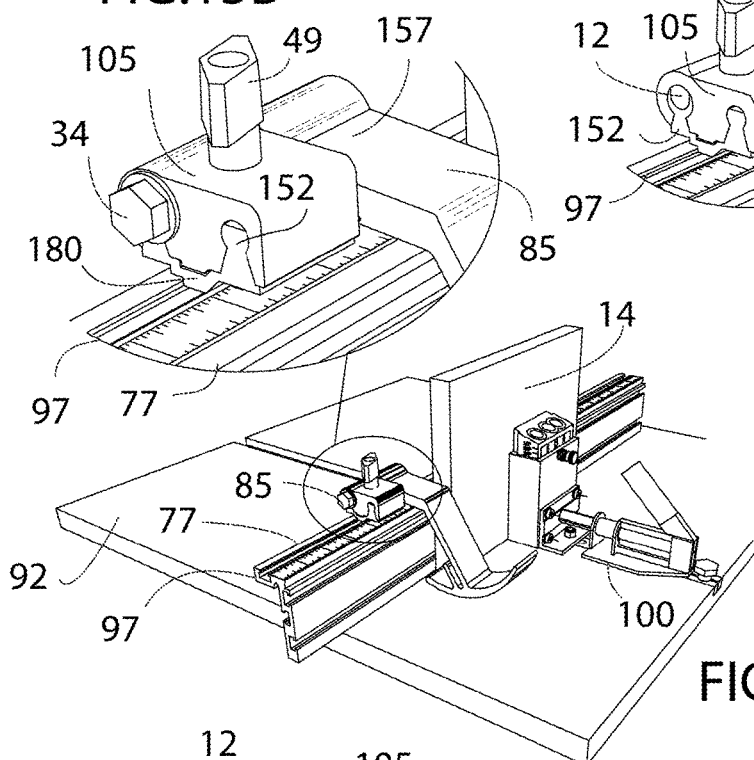
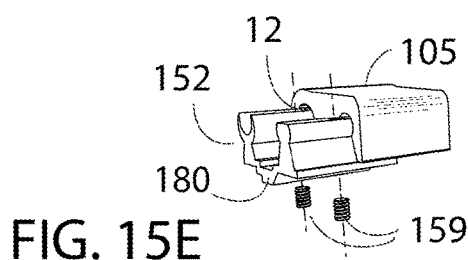
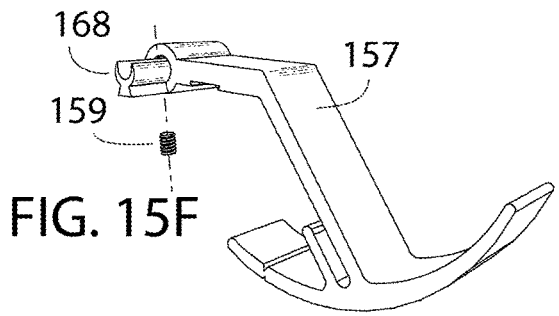
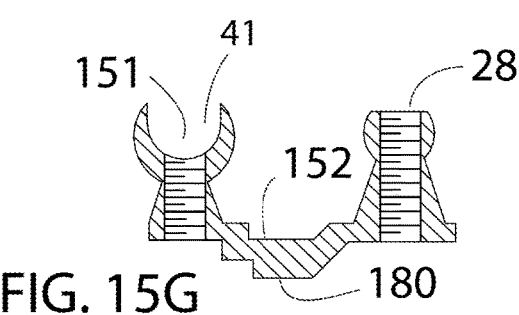
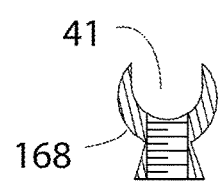
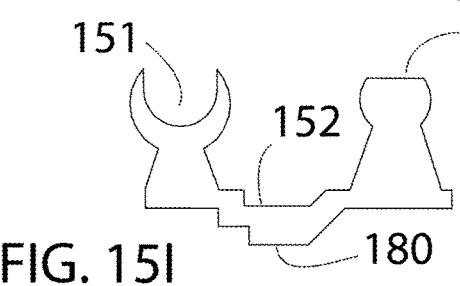

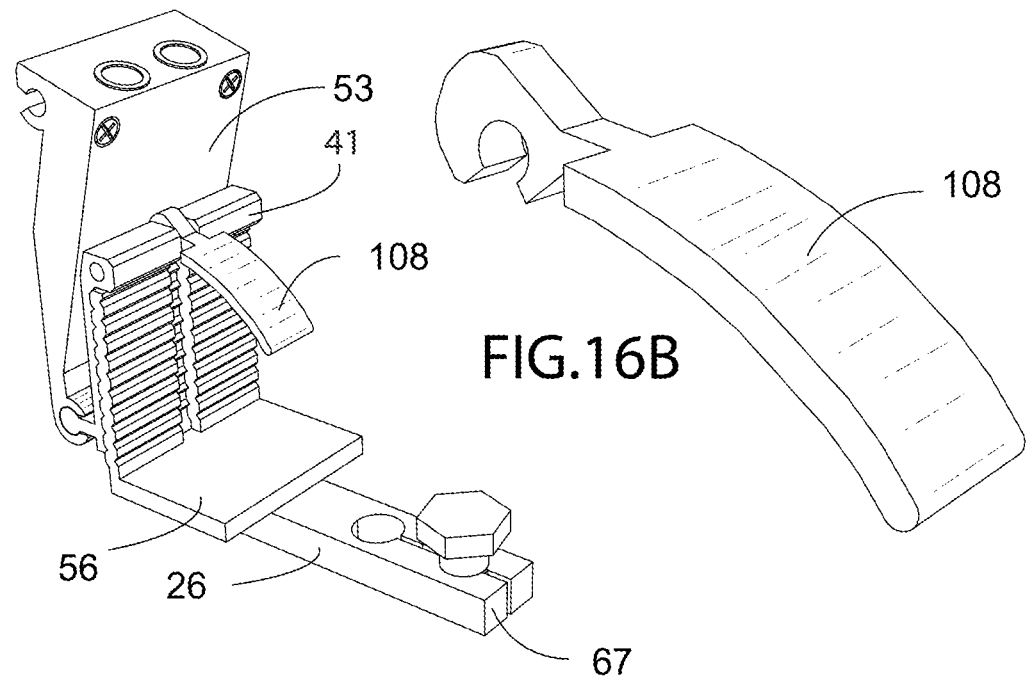
FIG. 16A
FIG. 16B
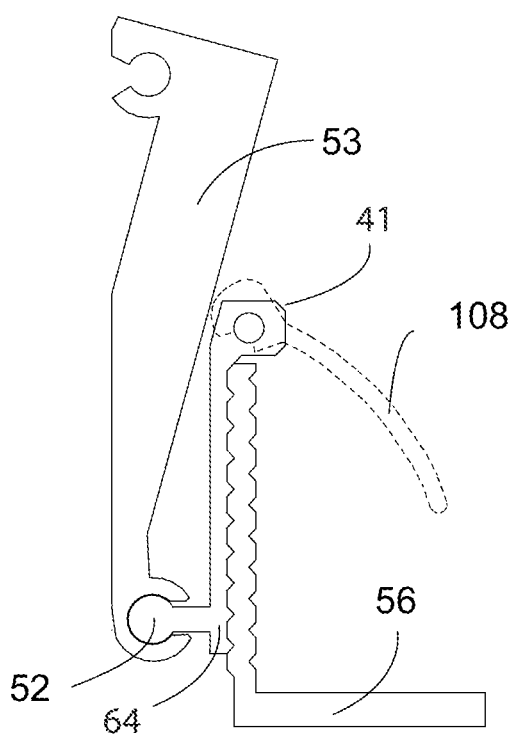
FIG. 16C
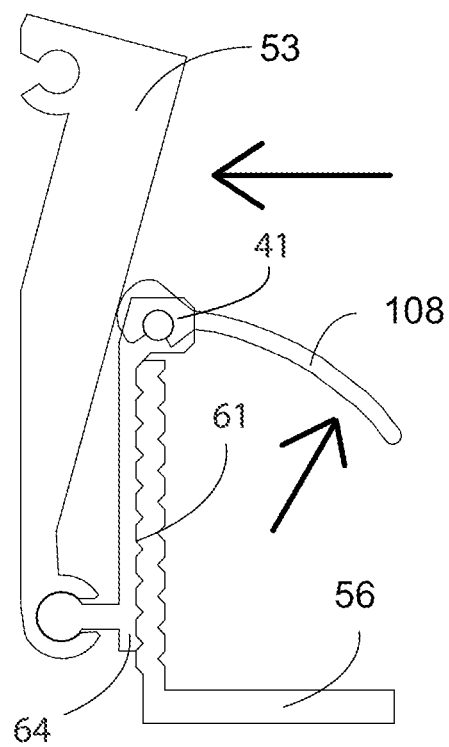
FIG. 16D

MITER BAR POCKET HOLE JIG SYSTEMS AND METHODS

CROSS-REFERENCE TO RELATED APPLICATIONS

This application claims priority under 35 U.S.C. § 119 to U.S. Provisional Application No. 63/025,633 filed May 15, 2020, the entire contents of which are incorporated herein by reference.

STATEMENT CONCERNING FEDERALLY SPONSORED RESEARCH OR DEVELOPMENT

Not applicable.

FIELD OF THE INVENTION

This invention relates to jigs and fixtures for aligning, guiding, and holding a workpiece during a woodworking operation.

BACKGROUND OF THE INVENTION

Woodworking machinery and equipment utilize various methods of positioning and/or securing a workpiece as it is cut, drilled, routed or sanded. As standard equipment, a pocket hole jig is not equipped with a mechanism to quickly secure it to a work table. The KREG pocket hole jig has holes so that screws can be used to secure the jig to an auxiliary work surface. The KREG K4 jig has a pad so that the jig can be clamped to a work bench table. With the KREG jigs, the workpiece rests on the floor of the jig, which is elevated above the work bench table. Wide boards or panels have to be supported to keep the workpiece parallel to the floor of the jig. Extrusion stop systems, such as those described in U.S. Pat. No. 7,798,187 B1 to Duginske, do not readily adapt to the KREG jigs.

SUMMARY OF THE INVENTION

In one embodiment, the example miter bar based pocket hole jig of this invention allows the positioning, clamping, and drilling function of the pocket hole jig while the workpiece rests flat on the table saw, or a router table surface that has a miter bar slot. The clamping and drill guide mechanisms are connected to a miter gauge bar, which rests inside the table slot. The miter bar pocket hole jig described may employ two miter bars with a hole and slot tightening mechanism in each miter bar. One miter bar supports the drill guide and clamping mechanism. Another miter bar supports an L-shaped miter gauge head. The double miter bar system of this invention allows each miter bar to be locked into the miter slot and repositioned independently. Either miter bar can be quickly adjusted for the workpiece thickness. The vertical leg of the miter head can also support a miter gauge extrusion and stop system, such as described in U.S. Pat. No. 7,798,187 B1.

In another embodiment, the example pocket hole drill guide of this invention is secured to the miter bar with an L-shaped bracket with indentations on both sides of the vertical side. An example Z-shaped connector with matching indentations is bolted to the L-shaped bracket. The indentations allow the Z-shaped connector to be secured to the L-shaped bracket at a variety of locations. The top end of the Z-shaped extrusion is a rectangular shape with a threaded hole for the clamping knob. The bottom of the Z-shaped extrusion has a short leg with a round protrusion. The drill guide may be rectangular in shape with a rounded opening at the bottom that accepts the round protrusion of the connector forming a hinge mechanism. The hinge design allows the threaded knob to move the pocket hole drill guide forward (e.g., away from the L-shaped bracket and the Z-shaped extrusion), clamping the workpiece in position for drilling the pocket holes.

In yet a further embodiment, the example double miter bar design of the invention can be used with, for instance, the KREG drill guide block. An example U-shaped fixture holds the KREG drill guide block so that it can be used as the drilling guide with the double miter bar system of this invention. The miter fence extrusion described in U.S. Pat. No. 7,798,187 B1 can be used with the lockable miter bar head to measure the location of the workpiece in relationship to the drill guide. This invention includes an extrusion for extending the length of the KREG miter gauge extrusion of U.S. Pat. No. 7,798,187 B1.

In a further embodiment, another improvement of this invention is an example pair of bushings for adding a set screw adjustment to the KREG flip stop arm and base. U.S. Pat. No. 7,798,187 B1 describes a screw adjustment on both the flip stop arm and the flip stop base for adjusting the tension on the bolt to purportedly establish an accurate fit to decrease sloppiness. U.S. Pat. No. 7,798,187 B1 includes FIGS. 8B and 8C that illustrate a set screw 22 for adjusting the tension of the flip stop arm. The screw for adjusting the tension of the flip stop base is illustrated in FIG. 8B as number 42. KREG replaced this set screw design with oversized holes and a loose fitting plastic bushing, thus creating an imprecise fit. The example bushings described herein slide into the oversized holes in the flip stop base and arm. Set screws in the bushing adjust the fit of the flip stop base and the flip arm in relationship to the bolt that holds them together. Therefore, the example bushings provide an improved adjustment system and replace the plastic loose fitting bushings of the current KREG flip stop.

In an additional embodiment, an example portable miter slot extrusion can be used with a miter saw auxiliary extension table as a platform for the miter bar based pocket hole jig of this invention. The example embodiment includes a V-shaped flip stop arm that is reversible and a flip stop base. Both the flip stop arm and the base feature a clamshell hinge clamping system for adjusting the tension on the bolt.

In yet a further embodiment, the double miter bar system includes flip stops and fence setups that are easily removed and replaced. Stop and fence setups, such as the examples described in U.S. Pat. Nos. 5,768,966 and 7,798,187 (both patents are hereby incorporated by reference as if fully set forth herein), can be easily removed and repositioned. The efficient design of the miter head bar system allows manufacturing and production of an economical commercial product. For even more efficiency, the miter head bar system and the track and stop setups can be readily removed and stored as a unit.

The foregoing and other embodiments, features, objects, and advantages of the invention will appear in the detailed description that follows. In the description, reference is made to the accompanying drawings that illustrate the preferred example embodiments of the invention.

BRIEF DESCRIPTION OF THE DRAWINGS

FIG. 1A is a perspective view of a miter bar pocket hole jig positioned in the miter slot of a table saw top.

FIG. 1B is an enlarged view of a portion of FIG. 1A. The workpiece is illustrated with dotted lines. The workpiece is sandwiched between the miter bar pocket hole jig drill guide and clamping mechanism illustrated in the right foreground and the miter gauge head illustrated in the left background of the drawing.

FIG. 1C illustrates the miter bar hinge style miter bar pocket hole jig.

FIG. 1D illustrates the miter gauge head and the miter bar.

FIG. 2A is a perspective view of the miter bar pocket hole jig illustrating the connector sliding into the drill guide.

FIG. 2B is a perspective view of the miter bar pocket hole jig illustrating the connector sliding into the drill guide shown from the opposite side of FIG. 2A.

FIG. 2C is an end view of the miter bar pocket hole jig.

FIG. 2D is an enlarged view of a portion of FIG. 2C illustrating the mating indentations of the L-shaped bracket and the Z-shaped connector.

FIG. 2E is an end view of the miter bar pocket hole jig drill guide.

FIG. 2F is an end view of the miter bar pocket hole jig connector.

FIG. 2G is an end view of the miter bar pocket hole jig drill L-shaped bracket.

FIG. 3A is a perspective view of the hinge style miter bar pocket hole jig drill guide and clamping mechanism. The workpiece is illustrated with a dotted line.

FIG. 3B is an end view of the drill guide block and clamping mechanism.

FIG. 3C is an enlargement of a portion of FIG. 3B illustrating the hinge mechanism that allows the drill guide block to rotate.

FIG. 3D is an end view of the drill guide in the engaged position illustrated with a solid line. The non-engaged position is illustrated with a dotted line.

FIG. 3E is an end view of the bottom of the drill guide illustrating the circular opening in the drill guide extrusion.

FIG. 3F is the end view of the circular hinge member of the connector between the L-shaped bracket and the drill guide.

FIG. 4A is a perspective view of a miter bar pocket hole jig positioned in the miter slot of a table saw top. The L-shaped mounting bracket shown in the previous illustrations has been replaced with a Z-shaped bracket that is bolted to the miter bar located in the table saw miter slot. The drill guide is positioned at a 45 degree angle from the miter slot to allow the pocket hole drilling of a mitered board.

FIG. 4B is an enlarged view of a portion of FIG. 4A illustrating the drill guide.

FIG. 4C is an end view of the Z-shaped mounting bracket, the connector, and the drill guide.

FIG. 4D is a perspective view of a miter saw fitted with a T-slot extension table. The miter bar pocket hole jig is positioned inside a portable miter slot extrusion that is bolted to the T-slot in the extension table.

FIG. 4E is an enlarged view of a portion of FIG. 4D illustrating the drill guide positioned in the portable miter slot extrusion.

FIG. 5A is a perspective view of the miter bar pocket hole jig. The pocket hole jig has been removed from the miter bar and is in use as a portable pocket hole jig. The L-shaped bracket has been reversed so that the short leg supports the bottom of the workpiece. The L-shaped clamp arm secures the workpiece to the pocket hole jig.

FIG. 5B is a perspective view of the miter bar pocket hole jig illustrated in FIG. 5A shown from a view that illustrates the clamp knob and the thumb screws.

FIG. 5C is an enlarged view of a portion of FIG. 5B illustrating the clamp arm and thumb nut.

FIG. 5D is a perspective view illustrating the L-shaped rod clamp arm of FIG. 5A with the long leg threaded. The threads are machined to create two parallel flat surfaces.

FIG. 5E is a perspective view illustrating the U-shaped block of FIG. 5C with the rectangular opening sized to accept the parallel machined surfaces of the threaded clamp arm.

FIG. 6A is a perspective view of the miter bar pocket hole jig positioned in the miter slot of a table saw top. The workpiece is illustrated with a dotted line. An L-shaped T-slot track extrusion supports the workpiece. V-shaped flip stops are secured to the top of the T-slot track.

FIG. 6B is an enlarged view of the V-shaped flip stop arm illustrated in FIG. 6A.

FIG. 6C is an end view of the V-shaped flip stop base extrusion. The clamshell shaped hinge design allows the top of the stop base body to flex and tighten the bolt.

FIG. 6D is an end view of the V-shaped flip stop arm extrusion. The clamshell shaped hinge design allows the top of the stop arm body to flex and tighten the bolt.

FIG. 6E is an end view of the track extrusion illustrated in FIG. 6A.

FIG. 6F is an end view of the U-shaped track extension extrusion illustrated inside the auxiliary T-slot track.

FIG. 6G is an end view of the auxiliary T-slot track.

FIG. 6H is an end view of the U-shaped track extension extrusion.

FIG. 6I is a perspective view of the V-shaped flip stop arm and base extrusion illustrated in FIG. 6B.

FIG. 7A is a perspective view of a miter bar U-shaped fixture designed to hold the KREG pocket hole jig guide block positioned in the miter slot of a table saw top. The KREG T-slot track shown in the illustration is from U.S. Pat. No. 7,798,187 B1.

FIG. 7B is an enlarged view of a portion of FIG. 7A illustrating the T-slot extension extrusion and V-shaped flip stop.

FIG. 7C is an enlarged view of the U-shaped fixture and the KREG drill guide illustrated in FIG. 7A. The U-shaped fixture is connected to the end of the toggle style push clamp.

FIG. 7D is a close up view of the end of the KREG track as shown in FIG. 7A.

FIG. 7E is an end view of the KREG track and the L-shaped track in accordance with this invention.

FIG. 7F is a perspective view of the U-shaped fixture, the KREG drill guide, and the toggle style push clamp illustrated in FIG. 7C.

FIG. 8A is a perspective view of a miter bar U-shaped fixture designed to hold the KREG pocket hole jig guide block. It is illustrated from the clamp side. The workpiece is illustrated with dotted lines.

FIG. 8B is a perspective view of the two miter bars shown in FIG. 8A with the U-shaped fixture, the toggle clamp, and miter head removed from the bars.

FIG. 8C is a perspective view of the miter bar U-shaped fixture designed to hold the KREG pocket hole jig guide block. It is illustrated from the miter head side. The workpiece is illustrated with dotted lines.

FIG. 8D is a perspective view of the two miter bars shown in FIG. 8C with the U-shaped fixture, the toggle clamp, and miter head removed from the bar.

FIG. 8E is a perspective view of the miter bar U-shaped fixture designed to hold the KREG pocket hole jig guide block. It is illustrated from the clamp side.

FIG. 8F is a perspective view of the KREG pocket hole jig guide block. It is aligned with the U-shaped fixture illustrated in FIG. 8E.

FIG. 8G is a perspective view of a miter bar and the miter head L-shaped extrusion shown from the bottom view.

FIG. 8H is an enlarged view of the hole and slot bar locking mechanism illustrated in FIG. 8G. As the knob is tightened, the two halves expand and lock the miter bar into the miter slot.

FIG. 8I is a perspective view of a miter bar U-shaped fixture designed to hold the KREG pocket hole jig guide block shown from the bottom view.

FIG. 8J is an enlarged view of the hole and slot bar locking mechanism illustrated in FIG. 8I. As the knob is tightened, the two halves expand and lock the miter bar into the miter slot.

FIG. 9A is a perspective view of a miter bar U-shaped fixture designed to hold the KREG R3 pocket hole jig guide block. The U-shaped fixture is connected to the end of the toggle style push clamp.

FIG. 9B is an enlarged view of the U-shaped fixture illustrated in FIG. 9A.

FIG. 9C is an enlarged view of the KREG R3 guide block illustrated in FIG. 9A.

FIG. 10A is a perspective view of a miter bar U-shaped fixture designed to hold the MILESCRAFT pocket hole jig.

FIG. 10B is an enlarged view of the MILESCRAFT pocket hole jig illustrated in FIG. 10A.

FIG. 10C is an enlarged view of the clamping mechanism illustrated in FIG. 10A.

FIG. 11A is a perspective view of a miter saw positioned on a folding miter saw stand.

FIG. 11B is a perspective view of the miter saw.

FIG. 11C is a perspective view of the two miter saw mounting brackets that attach the miter saw to the stand.

FIG. 11D is an illustration of the saw horse style miter saw stand.

FIG. 12A is a perspective view of a miter saw positioned on a folding miter saw stand, with the legs not shown.

FIG. 12B is an enlarged view of two L-shaped brackets with slots which allow the two brackets to be secured to each other with bolts in a variety of positions. The L-shaped brackets are illustrated with one leg of one of the brackets sandwiched between the miter saw and the miter saw mounting bracket.

FIG. 12C is a perspective view of the two L-shaped brackets bolted together. The illustration shows the two L-shaped brackets removed from the saw.

FIG. 12D is a perspective view of the two L-shaped brackets bolted together. The illustration shows the two L-shaped brackets from a perspective below the miter saw.

FIG. 12E is a modified perspective end view of a saw mounting bracket.

FIG. 12F is a modified perspective end view of an L-shaped saw mounting bracket with equal leg lengths.

FIG. 12G is a modified perspective end view of an L-shaped saw mounting bracket with one long leg length that is in the horizontal plane.

FIG. 12H is a perspective view of a miter saw T-slot extension table.

FIG. 12I is an exploded perspective view of FIGS. 12E to 12H.

FIG. 13A is a perspective view of a saw horse style folding miter saw stand.

FIG. 13B is a perspective view of a miter saw positioned above and in alignment with the folding miter saw stand. A short piece of T-slot extension table track is positioned on each side of the saw and is level with the saw table.

FIG. 13C is an enlarged view of a portion of FIG. 13B. One of the slotted L-shaped mounting brackets is sandwiched between the miter saw and the stand mounting brackets. A short piece of T-slot extension table is mounted on top of the double-L shaped mounting brackets. The two slotted L-shaped brackets are adjusted so that the T-slot extension table is aligned (e.g., level) with the bed of the miter saw. The design allows the miter saw to be removed from the stand with the small extension tables intact on both sides of the miter saw.

FIG. 13D is a perspective view of a miter saw positioned on a folding miter saw stand. The folding saw horse legs are not shown in this illustration. The short piece of T-slot extension table track illustrated in FIG. 13C is fitted with two pieces of rectangular T-slot track, which are located in the large T-slots located in the bottom of the T-slot tract extension table.

FIG. 13E is an enlarged view of a portion of FIG. 13D. A short piece of T-slot extension table is mounted on top of the double L-shaped mounting brackets. Two pieces of T-slot track extend from the short T-slot extension table and mate with a longer T-slot extension table.

FIG. 13F is an enlarged view of a T-slot extension table with the two T-slot extensions protruding from the T-slots located in the bottom of the extension table extrusion.

FIG. 15A is a perspective view of a table saw with the KREG drill guide miter bar system positioned on a table saw top. The workpiece is in contact with the KREG flip stop and the KREG L-shaped track extrusion.

FIG. 15B is an enlarged perspective view of the KREG flip stop shown in FIG. 15A.

FIG. 15C is a perspective view that illustrates the KREG flip stop base and the U-shaped bushing.

FIG. 15D is a perspective view that illustrates the U-shaped bushing.

FIG. 15E is a perspective view of the KREG flip stop base and the bushing that fits inside of it.

FIG. 15F is a perspective view of the KREG flip stop arm and the bushing that fits inside of the hole openings.

FIG. 15G is an end section view of the U-shaped bushing.

FIG. 15H is an end section view of the U-shaped bushing designed to slide into the flip stop arm as illustrated in FIG. 15F. A threaded hole is located in the middle of the bushing.

FIG. 15I is an end view of the U-shaped bushing that fits inside the KREG flip stop base.

FIG. 15J is an end view of the U-shaped bushing that fits inside the KREG flip stop arm.

FIG. 16A is a perspective view of the hinge style pocket hole drill guide block illustrated in FIGS. 1A and 1B. The threaded knob has been replaced with a cam lever for pushing the drill guide into the workpiece.

FIG. 16B is an enlargement of the cam lever removed from the drill guide.

FIG. 16C is an end view of the drill guide block with the cam lever illustrated with a dotted line.

FIG. 16D is an end view of the drill guide block with the cam lever illustrated with a solid line. Arrows illustrate that as the cam lever is lifted, the cam action pushes the drill guide block forward into the workpiece.

DETAILED DESCRIPTION OF THE PREFERRED EMBODIMENT

Figure 6J:
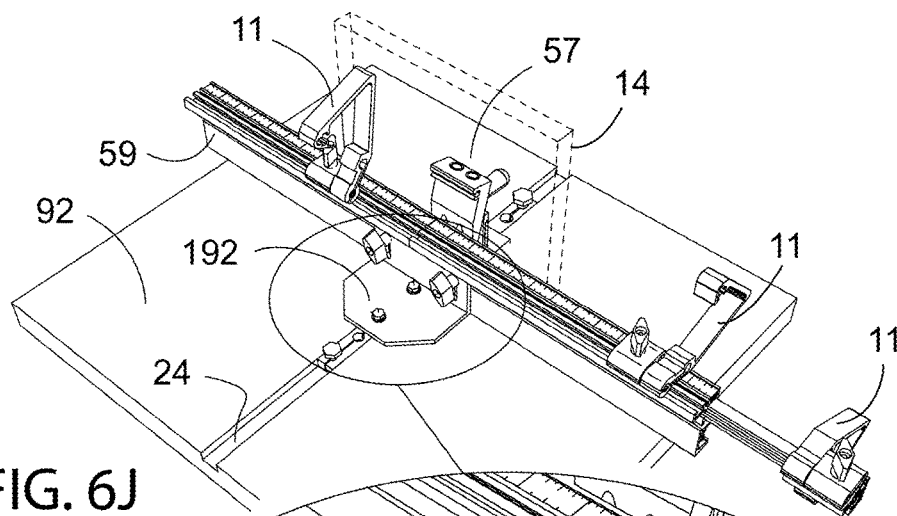
FIG. 6J is a perspective of a table saw top with a two-part miter bar based pocket hole jig. In the foreground of the drawing is a miter gauge L-shaped angle head attached to a miter bar with a locking mechanism for locking the miter bar, and thus the miter head, in the table saw miter slot. Attached to the vertical leg of the miter gauge head is an L-shaped fence extrusion that supports flip stops for repeatable locating of the workpiece in relationship to the pocket hole drill guide.

In the following detailed description of the preferred embodiments, reference is made to the accompanying drawings that form a part hereof, and in which is shown by way of illustration specific preferred example embodiments in which the invention may be practiced. These embodiments are described and shown in sufficient detail to enable those skilled in the art to make and use the invention. Given the benefit of this disclosure, one skilled in the art will understand that other embodiments may be utilized and that mechanical, procedural, and other changes may be made without departing form the spirit and scope of the present invention. In addition, while the various embodiments identify example or preferred hardware (e.g., bolts, thumb screws, etc.) capable of incorporation, one skilled in the art will appreciate that a variety of alternatives are available to accomplish the relevant constructions and functions, including both use of off-the-shelf hardware and/or custom specification components.

Referring to FIG. 1A, an example woodworking machinery jig and fixture system is disclosed incorporating a miter bar pocket hole jig drill guide and clamping mechanism 57 and a miter bar and miter head system 192 locked into or releasably secured to a table saw miter slot 24. FIG. 1B is an enlarged view of a portion of FIG. 1A. The workpiece 14 is illustrated with dotted lines. The workpiece 14 is sandwiched between the miter bar pocket hole jig drill guide and clamping mechanism 57 illustrated in the right foreground and the miter head 192 illustrated in the left background of the drawing. FIG. 1C is an enlarged view of FIG. 1B, illustrating the miter bar pocket hole jig drill guide and clamping mechanism 57 removed from the table saw. A pocket hole drill guide 53 is connected to a Z-shaped bracket fixture 64, which is secured to an L-shaped bracket 56 (e.g., via a threaded coupling illustrated in, for instance, FIG. 1C). The L-shaped bracket 56 is secured to a miter gauge bar 96 with bolts 34 that cooperate with threaded holes (not shown) in the miter gauge bar 96. A locking mechanism 67 secures the jig 57 in the miter gauge slot 24. The locking mechanism 67 includes a locking member (e.g., a threaded bolt and cap) that when manipulated (e.g., rotated) urges split fingers formed in the miter gauge bar 96 outward to wedge or retain the miter gauge bar 96 within and the table saw miter slot 24 (e.g., the bolt can be threaded into an undersized threaded cavity defined by split fingers of the miter gauge bar 96). The form of the locking mechanism 67 can take various forms depending on specific application requirements, as will be appreciated by one of ordinary skill when given the benefit of this disclosure. FIG. 1D is an enlarged view of FIG. 1B illustrating the lockable miter bar and miter head system 192. In the illustration, the miter bar head 72 and locking mechanism 67 are shown removed from the table saw top 92. The miter bar and miter head system 192 is secured (e.g., bolted) to miter bar 84 such that the miter bar and miter head system 192 can be releasably secured to the table saw miter slot 24 via the locking mechanism 67 in a manner similar to that described above. Slots 44A are located in the vertical leg of the miter bar head 72 as a mechanism for securing a fence extrusion. The particular arrangement, which includes the ability for independent adjustment, of the miter bar pocket hole jig drill guide and clamping mechanism 57 and the miter bar and miter head system 192 provides for efficient and convenient adjustment of the relative positioning of each component with in the miter slot 24, and thus easily accommodates workpieces 14 of varying form factors.

In one embodiment, the miter bar pocket hole jig drill guide and clamping mechanism 57 further provides for an adjustable (e.g., pivotable) clamping feature. FIG. 2A is a perspective view of the miter bar pocket hole jig illustrating an example hinge mechanism 43 that includes a round hinge pin 52 formed on the Z-shaped fixture 64 that is slidably received into a round drill guide opening 63 formed on the drill guide 53. FIG. 2B is a perspective view shown from the opposite side of FIG. 2A. FIG. 2C is an end view of the miter bar pocket hole jig illustrating the drill guide 53, the Z-shaped fixture 64 and the L-shaped bracket 56. The Z-shaped fixture 64 and the L-shaped bracket 56 have a cooperating corrugated design 61 that is configured to provide an inter-fitting mate with each other that also allows for raising and lowering the Z-shaped fixture 64 (and hence drill guide 53) relative to the L-shaped bracket 56. This illustration also shows the hinge mechanism 43 that allows the drill guide 53 to be pivotable about pivot axis of the hinge mechanism 43, and thus the drill guide 53 can be selectively rotated away from and toward the Z-shaped fixture 64 (and the coupled L-shaped bracket 56). FIG. 2D is an enlarged view of a portion of FIG. 2C illustrating the mating indentations (e.g., corrugated design 61) of the L-shaped bracket 56 and the Z-shaped connector 64. FIG. 2E is an end view of the example miter bar pocket hole jig drill guide 53. FIG. 2F is an end view of the example Z-shaped connector 64. And, FIG. 2G is an end view of the example L-shaped bracket 56.

FIG. 3A is a perspective view of the miter bar pocket hole jig drill guide and clamping mechanism 57 and the miter bar and miter head system 192, both shown removed from the example miter slot 24 shown in FIG. 1A. The workpiece 14 is illustrated with a dotted line and is clamped between the miter bar pocket hole jig drill guide and clamping mechanism 57 and the miter bar and miter head system 192. FIG. 3B is an end view of the drill guide 53 and an example clamping mechanism, which is the handle 54 with threads. As the handle 54 is rotated, the tip of the threaded end of the handle is translated to provide a force that pivots the drill guide 53 about the hinge mechanism 43 to push or urge the drill guide 53 into the engaged position so that a vertical surface 80 of the drill guide 53 comes into contact with the workpiece 14. The clamping mechanism is generally configured to adjust the pivotal offset of the drill guide 53 relative to the Z-shaped bracket connector 64, and when a workpiece 14 positioned between the drill guide 53 and the miter bar head 72 can provide a clamping force to retain the workpiece 14. FIG. 3C is an enlargement of a portion of FIG. 3B illustrating the example hinge mechanism 43 that allows the drill guide 53 to rotate and contact the workpiece 14. FIG. 3D is an end view of the drill guide 53 in the engaged position illustrated with a solid line 80. As shown in FIG. 3A, when the miter bar and miter head system 192 is secured (e.g., locked within the miter slot 24 to inhibit translation along the miter slot 24), the workpiece is effectively clamped when the drill guide 53 is urged toward or into the engaged position generally depicted in FIGS. 3B and 3D. The non-engaged position is illustrated with a dotted line 82; in the non-engaged position, the workpiece can be readily removed. FIG. 3E is an end view of the bottom of the example drill guide 53 illustrating the circular opening 63 in the extrusion forming the example drill guide 53. FIG. 3F is the end view of the circular hinge member (e.g., hinge pin 52) formed on the example Z-shaped bracket connector 64 that establishes the connection between the L-shaped bracket 56 and the drill guide 53. Given the benefit of this disclosure, one skilled in the art will appreciate the various forms the example clamping mechanism may take and continue to provide the clamping function disclosed herein.

FIG. 4A is a perspective view of a horizontal pocket hole drilling system 39 positioned in the miter slot 24 of a table saw top 92. The L-shaped mounting bracket shown in the previous illustrations has been replaced with a Z-shaped bracket 58 that is secured (e.g., bolted) to a miter bar (e.g., similar to miter bars 84, 96) located in the table saw miter slot 24. The horizontal pocket hole drilling system 39 is shown with the drill guide 53 positioned at a 45-degree angle from the miter slot 24 to allow, for instance, the pocket hole drilling of a mitered board. This horizontal pocket hole drilling system 39 can also be secured to a work bench top. FIG. 4B is an enlarged view of a portion of FIG. 4A illustrating the drill guide 53 in the horizontal position. FIG. 4C is an end view of the horizontal pocket hole drilling system 39 which includes the Z-shaped mounting bracket 58, the Z-shaped connector 64, and the drill guide 53.

As one of skill in the art will appreciate when given the benefit of this disclosure, the various embodiments can be adapted for use with various woodworking machinery and equipment. For instance, FIG. 4D is a perspective view of a miter saw 19 fitted with a T-slot extension table 29. The miter bar pocket hole jig drill guide and clamping mechanism 57 is positioned inside an example portable miter slot extrusion 30 that is secured (e.g., bolted) to the T-slot 97 in the extension table 29. FIG. 4E is an enlarged view of a portion of FIG. 4D illustrating the miter bar pocket hole jig drill guide and clamping mechanism 57 positioned in the portable miter slot extrusion 30. The miter bar pocket hole jig drill guide and clamping mechanism 57 can be readily positioned and repositioned along the length of the T-slot 97 in the extension table 29 to accommodate workpieces of various form factors.

The miter bar pocket hole jig drill guide and clamping mechanism 57 can also be adapted to provide a standalone, portable configuration. For example, the pocket hole drill guide 53 of this invention can also be used portably by removing the miter bar 96 and reversing the L-shaped angle bracket 56 as illustrated in FIG. 5A. FIG. 5A is a perspective view of the miter bar pocket hole jig 53 removed from the miter bar and is in use as a portable pocket hole jig. The L-shaped bracket 56 has been reversed so that the short leg supports the bottom of the workpiece 14. An example L-shaped clamp arm 45 is provided to releasably secure the workpiece 14 to the pocket hole drill guide 53. FIG. 5B is similar to FIG. 5A and illustrates the clamp side of the miter bar pocket hole jig drill guide and clamping mechanism 57. With additional reference to FIGS. 5C, 5D, and 5E, the L-shaped clamp arm 45 is configured to be adjustable in extension from the Z-shaped connector 64. A block 35 is coupled to or secured to (e.g., bolted, adhered, and the like) to the Z-shaped connector 64 (e.g., a screw can extend into an opening in the end face of the block 35 that engages a receptacle (e.g., threaded bore) in the Z-shaped bracket connector 64) and includes a slot through which a flat-sided threaded rod 32 of the L-shaped clamp arm 45 extends. Adjusting a thumbscrew 36 and a lock nut 33 along the flat-sided threaded rod 32 alters the relative positioning of the L-shaped clamp arm 45 to accommodate variations in the workpiece 14, and aids clamping of the workpiece 14 against the pocket hole drill guide 53. In other embodiments, the block 35 maybe integral with the Z-shaped bracket connector 64 (e.g., machined or cast) and/or may be associated with the L-shaped bracket 56.

FIG. 6A is a perspective view of the miter bar pocket hole jig drill guide and clamping mechanism 57 positioned in the miter slot 24 of a table saw top 92. The workpiece 14 is illustrated with a dotted line. An L-shaped T-slot track extrusion 59 supports the workpiece 14. V-shaped flip stops 11 are secured to the top of the T-slot track 59 (e.g., in either of the orientations illustrated in FIG. 6A) and configured to pivot (shown, for instance, in FIG. 6A). FIG. 6B is an enlarged view of the V-shaped flip stop 11 illustrated in FIG. 6A. The bolt/rod/fastener (e.g., see bolt 34A shown in FIG. 6I) extending between the V-shaped flip stop arm extrusion 47 and the stop base body extrusion 51 has been removed from the V-shaped flip stop 11 for clarity and to fully illustrate the clamshell design of the stop arm extrusion 47. FIG. 6C is an end view of an example flip stop base body extrusion 51 that is engaged with the L-shaped T-slot track extrusion 59 via the knob 49 and a fastener (e.g., a bolt (not shown) captured in T-slot track 59) and to which the V-shaped flip stop 11 is pivotally engaged (e.g., via the laterally extending bolt 34A). The clamshell shaped hinge design allows the top of the stop base body extrusion 51 to flex and tighten/clamp against the bolt 34A positioned within the clamshell (see the arrow illustrated in FIG. 6C), thus securing the relative position and inhibiting relative rotation of the bolt 34A. FIG. 6D is an end view of the V-shaped flip stop arm extrusion 47 with the hole 40 and threaded hole 41 depicted in profile for clarity. The similar clamshell shaped hinge design of the V-shaped flip stop arm extrusion 47 allows functional flexing of the clamshell by inserting the fastener 172 (e.g., machine screw) partially through the hole 40 and tightening into the threaded hole 41, thus providing a clamping force shown by the arrow in FIG. 6D that allows the rotational positon of the V-shaped flip stop arm extrusion 47 to be selectively adjusted and fixed relative to the flip stop base body extrusion 51 (e.g., the bolt 34A clamped in the stop base body extrusion 51). FIG. 6E is an end view of the L-shaped track extrusion 59 illustrated in FIG. 6A. A measuring tape indentation 66 is located on the floor of the inside opening close to the interior T-slot 97 so that the micro stop 50 is close to a measuring tape 88 as illustrated in FIG. 6B. FIG. 6F is an end view of the L-shaped track extrusion 65 illustrated in FIG. 6A. A large T-slot track 71 fits into a large interior T-slot space 73. A ruler indentation 74 allows, for instance, a stick-on tape measure 88 to be attached to the T-shaped track 71 as illustrated in FIGS. 6A and 6B. FIG. 6G is an end view of the T-slot track 65. FIG. 6H is an end view of the U-shaped T-slot track 71. FIG. 6I is a perspective view of the V-shaped flip stop arm extrusion 47 and the base extrusion 51 illustrated in FIG. 6B.

Figure 6K:
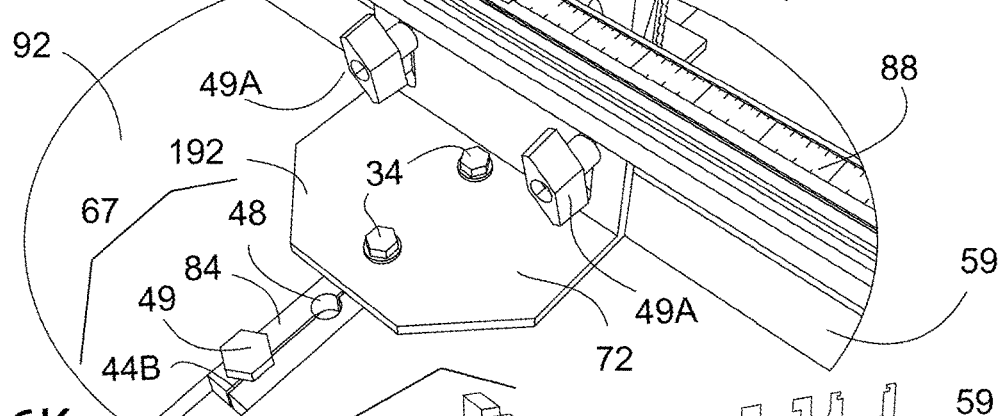
FIG. 6K is an enlargement of a portion of the miter gauge head illustrated in FIG. 6J. It illustrates the knobs used to tighten the L-shaped track extrusion to the vertical leg of the miter gauge head.
Figure 6L:
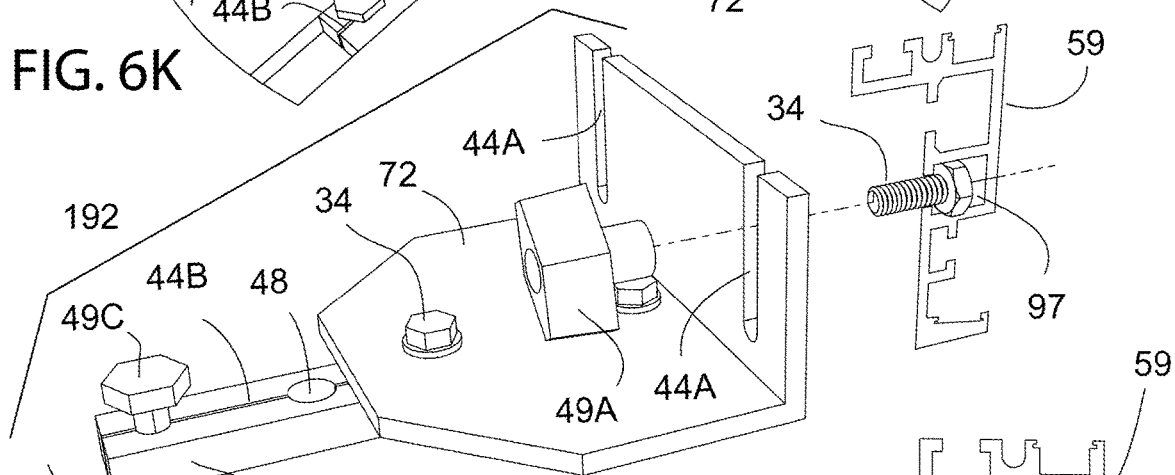
FIG. 6L is an exploded perspective view of the miter gauge head and attached bar and the fence extrusion in partial cross section (only the end plane of the fence extrusion is shown for clarity). The right side of the drawing illustrates a bolt in the T-slot of the L-shaped extrusion lined up with the knob, which can be operated to tighten the track and the miter head together. Two slots on each end of the vertical leg of the of the miter L-shaped extrusion allow the bolt to pass through the extrusion and mate with the threaded knob.
Figure 6M:
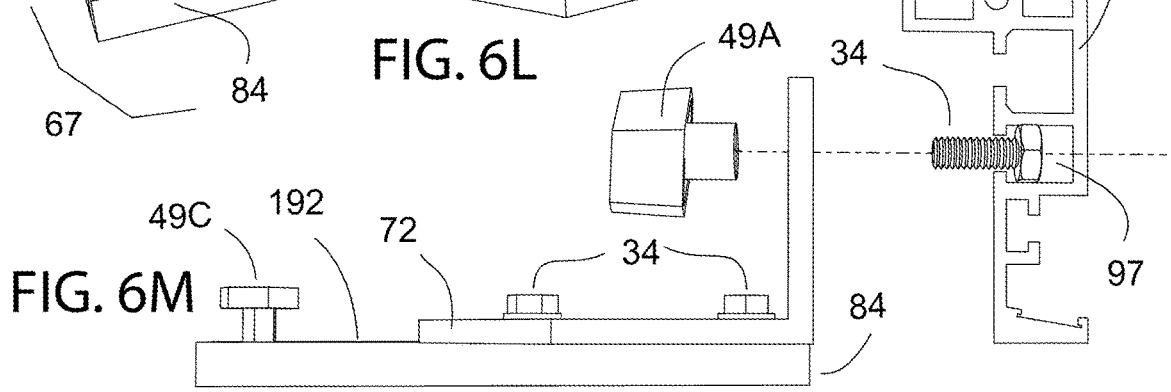
FIG. 6M is an end view of FIG. 6L illustrating a modified end view of the miter gauge head, the attached bar, and the fence extrusion. The right side of the drawing illustrates a bolt in the T-slot of the L-shaped extrusion lined up with the knob that tightens the track and the miter head together. Two slots, which are illustrated in FIG. 6L, on each end of the vertical leg of the miter L-shaped extrusion allow the bolt to pass through the extrusion and mate with the threaded knob.

As mentioned in the background of the invention, the typical pocket jig, such as the KREG jig, requires that a workpiece is elevated above the worktable. The double miter bar pocket hole jig described herein, however, allows the workpiece to rest flat on the top of a worktable when the miter bar is located in the miter slot. Another drawback of the KREG pocket hole drill guide is that there is not an easy way to attach a measuring device, such as an extrusion and stop system. FIGS. 6A and 6B illustrate the pocket hole jig 57, the track 59, and the flip stops 11 for accurately and repeatedly locating the workpiece. FIGS. 6A and 6B are shown from the front of the table saw table 92. FIG. 6J is a full view perspective of a table saw top with a two part minter miter bar based pocket hole jig. The perspective is from the back of the table saw top 92. It illustrates the pocket hole jig 57, the track 59, and the flip stops 11 for accurately and repeatedly locating the workpiece. It also illustrates that the track 59 is secured to the miter head and miter bar system 192 with, for instance, a thumb knob 49A. FIG. 6K is an enlargement of the miter gauge head system 192 illustrated in FIG. 6J. It depicts the knobs 49A used to tighten the L-shaped track extrusion 59 to the vertical leg of the miter gauge bar system 192. FIG. 6L is an exploded perspective view of the miter gauge head and bar system 192 and fence extrusion 59 (showing only the end face of the fence extrusion 59 for clarity). The right side of the drawing illustrates bolt 34 seated in the T-slot 97 of the L-shaped extrusion 59 and lined up with the knob 49A, which tightens the track and the miter head together. The two slots 44A on each end of the vertical leg of the of the L-shaped miter bar head 72 allow the shank of the bolt 34 to pass through the miter head 72 and mate with the threaded knob 49A, which can be rotated to tighten together the L-shaped track 59 and the miter head and bar system 192. FIG. 6M is an end view of FIG. 6L showing a modified end view of the miter gauge head bar system 192. The right side of the drawing again illustrates the bolt 34 in the T-slot 97 of the L-shaped extrusion 59 lined up with the knob 49A, which again tightens the track and the miter head bar system 192 together. Another advantage of the double miter bar system is the flip stops and fence setup can be easily removed and replaced. Stop and fence setups such as U.S. Pat. Nos. 5,768,966 and 7,798,187 can be easily removed and repositioned. The convenient design of the miter head bar system 192 allows the product to be manufactured and commercialized economically. For even more efficiency, the miter head bar system 192 and the track and stop setups may be removed and stored as a unit.

FIG. 7A is a perspective view of a KREG drill guide pocket hole system 100 illustrated on a table saw top 92. It is secured in a miter slot 24 with the locking mechanism 67. A KREG T-slot track 77 shown in the illustration is from U.S. Pat. Np. 7,798,187 B1. The track 77 is secured to the lockable miter bar and miter head system 192. A KREG flip stop 85 is also disclosed in U.S. Pat. No. 7,798,187 B1. The workpiece 14 is in contact with the flip stop 85. FIG. 7B is an enlarged view of the L-shaped track 83 extending from the edge of the KREG track 77. The example V-shaped flip stop 11 is secured with a knob 49 to the T-slot 97 on top of the L-shaped track 83. FIG. 7C is an enlarged view of FIG. 7A showing the KREG drill guide pocket hole system 100. FIG. 7D is a close-up view of the end of the KREG track 77 as shown in FIG. 7A. A measuring tape 88 is secured to the front of the L-shaped track 83. A through hole 40 allows a bolt to secure the smaller track 83 to the larger track 77. A flange 101 fits into the T-slot 97 in the KREG track 77. FIG. 7E is an end view of the KREG track 77 and the L-shaped track 83 of an embodiment of this invention. FIG. 7F is a perspective drawing of the KREG drill guide miter bar system 100 removed from the table saw.

FIG. 8A is a perspective view of the KREG drill guide miter bar system 100 illustrated from the clamp side. The workpiece 14 is illustrated with dotted lines. FIG. 8B is a perspective view of the two miter bars shown in FIG. 8A with the U-shaped fixture 81, the toggle clamp 18, and miter head 72 removed from the miter head bar 84 and the clamp bar 96. FIGS. 8C and 8D are similar to FIGS. 8A and 8B shown from the miter head side. FIG. 8E is a perspective view, illustrated from the clamp side, of a miter bar U-shaped fixture 81 designed to receive and hold a KREG pocket hole jig guide block 94. FIG. 8F is a perspective view of the KREG pocket hole jig guide block 94 aligned with the U-shaped fixture 81 illustrated in FIG. 8E. FIG. 8G is a perspective view, shown from the bottom, of the miter bar and miter head system 192, which includes the bar 84 and the miter head L-shaped extrusion 72. FIG. 8H is an enlarged view of the opening and slot bar locking mechanism 67 illustrated in FIG. 8G. The locking mechanism consists of a hole or opening 48 in the miter bar 84. Intersecting the opening 48 is a slot 44B that extends to the end of the miter bar 84. A flat head screw 122, for example, is located in an opening near the end of the slot 44 and sized to threadably engage with the knob 49. As the knob 49 is tightened to draw the knob 49 and the screw 122 together, the two portions on each side of the slot 44B are expanded and lock or wedge the miter bar 84 into the miter slot 24. FIG. 8I is a perspective view of a miter bar U-shaped fixture 81 designed to hold the KREG drill guide block 94 shown from the bottom view. The U-shaped fixture 81 is mounted to an L-shaped bracket 103 that is connected to the end of the toggle style push clamp 18. The example L-shaped bracket 103 is connected to the miter bar 84 with a toilet bolt 107 that fits in a slot 37. FIG. 8J is an enlarged view of the hole and slot bar locking mechanism 67 illustrated in FIG. 8I.

The example U-shaped fixture 81 shown in FIG. 8A is configured and adapted to receive an example KREG drill guide. However, given the benefit of this disclosure, one of ordinary skill will appreciate the various alterations and modifications that can be made to the fixture to accommodate various other drill guides, both in form factor and in manufacturer. For instance, FIGS. 9A, 9B, and 9C illustrate an example a miter bar U-shaped fixture 129 designed to accommodate and hold the KREG R3 pocket hole jig guide block 116. The L-shaped fixture bracket 103 is connected to the end of the toggle style push clamp 18. The U-shaped fixture 129 may be coupled to the L-shaped fixture bracket 103 via fasteners 115. Thumbscrews 128 can be engaged with and extend through the sides of the U-shaped fixture 129 to help secure the KREG R3 pocket hole jig guide block 116 with the U-shaped fixture 129. As another non-limiting example, FIGS. 10A, 10B, and 10C illustrate another miter bar U-shaped fixture 132 designed to hold the MILESCRAFT pocket hole jig 122. Again, the U-shaped fixture 132 may be coupled to the L-shaped fixture bracket 103 via fasteners 115, and thumbscrews 128 can be engaged with and extend through the sides of the U-shaped fixture 132 to help secure the MILESCRAFT pocket hole jig 122 with the U-shaped fixture 132.

Further embodiments of the invention can be adapted to enhance the construction and operation of various woodworking devices and arrangements. FIG. 11A is a perspective view of a miter saw 19 positioned on a folding miter saw stand 23 with folding legs 139. The miter saw 19 can be mounted to the stand 23 via bolts (not shown) partially extending through openings 200 formed in the miter saw 19. FIG. 11B is a perspective view of the miter saw 19. FIG. 11C is a perspective view of two miter saw mounting brackets 137 that attach the miter saw 19 to the stand 23. An opening 161 in the bottom of the bracket 137 matches the contour of the miter saw stand top 133. A clamp 123 secures the bracket 137 to the saw stand top 133. FIG. 11D is an illustration of the saw horse style miter saw stand 23 depicting a height adjustment support 141 that extends from the saw stand 23. The height adjustment support 141 includes a T-shaped adjustable material support 143 coupled near the end of a sliding support arm 147. The top of the miter saw stand 133 is contoured to allow the two miter saw mounting brackets 137 to be easily clamped and unclamped.

FIG. 12A is a perspective view of a miter saw 19 positioned on the folding miter saw stand 23. The legs 139 are not shown in this illustration. FIG. 12B is an enlargement of FIG. 12A illustrating the adjustable table mounting bracket 136 which includes an angle table bracket 127 that supports the table and a longer angled support bracket 112 that is sandwiched between the bottom of the miter saw 19 and the clamp mounting brackets 137. FIG. 12C illustrates the relative relationships between the example adjustable brackets 112, 127. Slots 44 in both brackets 112, 127 allow the height and lateral position of the table bracket 127 to be adjusted as desired to accommodate and facilitate woodworking devices and operations. While the example slots 44 are depicted as linear and parallel, the slots 44 can be of various form factors, such as providing a stepped or saw tooth configuration where discrete positions and steps are beneficial. FIG. 12D is a perspective view of two L-shaped bracket assembly 136 secured (e.g., bolted) together. The illustration is similar to FIG. 12B from a perspective below the miter saw 19. The L-shaped bracket assembly 136 is illustrated with one leg of bracket 112 positioned below the miter saw 19. FIG. 12E is a modified perspective end view of a saw mounting bracket 137. FIG. 12F is a modified perspective end view of an L-shaped saw mounting bracket 112 with equal leg lengths. FIG. 12G is a modified perspective end view of the L-shaped angle bracket 127 with slots 44. The long leg of the angle bracket 127 is in the horizontal plane. FIG. 12H is a perspective view of a miter saw T-slot extension table 138 that can be supported by and adjustably secured to the bracket 127 via slots 44. FIG. 12I is an exploded perspective view of illustrations FIGS. 12E-12H. The support bracket 112 can include openings (not shown) that can be aligned with openings 200 formed through the miter saw 19 such that bolts can be used to secure the support bracket 112 to, for instance, the slot 44D in the saw mounting bracket 137. In some forms, the slot 44D allows the bracket assembly 136 to be further adjustable along the length of the saw mounting bracket 137. Other mechanisms can be used to couple the support bracket 112 to the saw mounting bracket (e.g., clips). And, the support bracket 112 may alternatively be secured to either or both the miter saw 19 and/or saw mounting bracket 137, depending, for example, on whether the bracket assembly 136 is desired to be removable with the miter saw 19 or reside with the saw mounting brackets 137/miter saw stand 23. Given the benefit of this disclosure, one of skill in the art will appreciate that the bracket assembly 136 may be adapted to accommodate various application-specific requirements, such as by modifying the relative sizes of the brackets and/or the legs of the brackets.

FIG. 13A is a perspective view of a saw horse style folding miter saw stand 23 with T-shaped adjustable material supports 143 coupled to sliding support arms 147 extending from both ends of the saw stand 23. FIG. 13B is a perspective view of a miter saw 19 positioned above and in alignment with the folding miter saw stand 23. A short piece of T-slot extension table track 138 is secured on each side of the miter saw 19 and is level with the saw table 140. FIG. 13C is an enlarged view of a portion of FIG. 13B. One of the slotted L-shaped mounting brackets (e.g., bracket 127) of the bracket assembly 136 is sandwiched and/or otherwise secured between the miter saw 19 and the stand mounting brackets 137. The short piece of T-slot extension table top 138 is mounted on top of the double L-shaped mounting bracket assembly 136 (e.g., to bracket 127). The two slotted L-shaped brackets 112, 127 of the bracket assembly 136 are adjusted so that the T-slot extension table 138 is aligned (e.g., generally level) with the table top 140 of the miter saw 19. The design and configuration allows the miter saw 19 to be removed from the stand 23 with the mounting brackets 136 and small extension table 138 intact on both sides of the miter saw 19. FIG. 13D is another perspective view of the miter saw 19 positioned on a folding miter saw stand 23. The folding saw horse legs 139 are not shown in this illustration. The short piece of T-slot extension table track 138 illustrated in FIG. 13C is fitted with two pieces of rectangular T-slot track 71 (shown in FIGS. 13E and 13F), which are located in the large T-slots 73 located in the bottom of the T-slot track extension table 138 (shown in FIG. 13F). FIG. 13E is an enlarged view of a portion of FIG. 13D illustrating the T-slot table track 138 aligned with the T-slot track 71 before full engagement (compare the left and right sides shown in FIG. 13D). A short piece of T-slot table extrusion 138 is mounted on top of the double L-shaped mounting bracket assembly 136. Two pieces of T-slot track 71 extend from the short T-slot extension table 138 and mate with a longer T-slot extension table 138. FIG. 13F is an enlarged view of the T-slot extension table 138. Two T-slot extensions 71 protrude from the T-slots 73 located in the middle of the extension table extrusion 138. This configuration allows for the work surface to be extended and to accommodate various other aspects of the invention described herein.

Figure 14A:
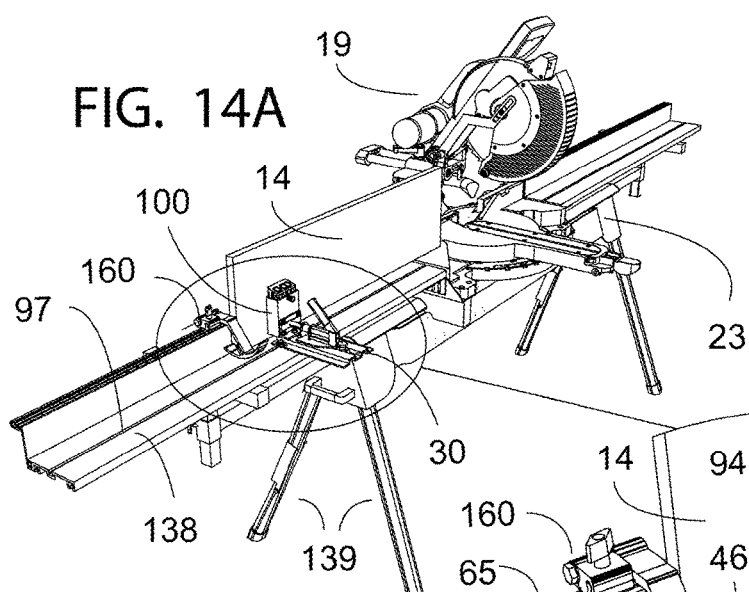
FIG. 14A is a perspective view of a miter saw positioned on a folding miter saw stand. The miter saw is fitted with the T-slot extension table illustrated in FIGS. 13A to 13E. The miter bar U-shaped fixture designed to hold the KREG pocket hole jig guide block is positioned on the portable T-slot extrusion.
Figure 14B:
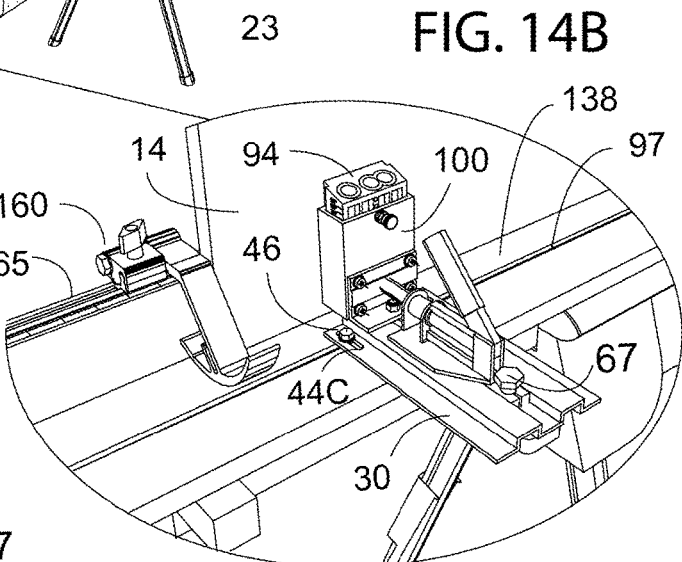
FIG. 14B is an enlarged view of the miter bar KREG drill guide system and portable miter slot extrusion shown in FIG. 14A.
Figure 14C:
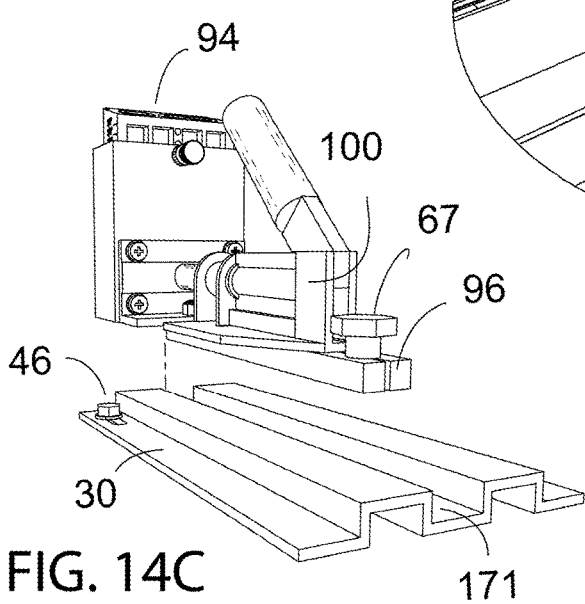
FIG. 14C is a perspective view of the miter bar KREG drill guide.
Figure 14D:
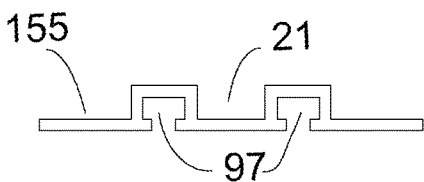
FIG. 14D is an end view of a portable miter slot extrusion with T-slots on each side of the miter slot.
Figure 14E:
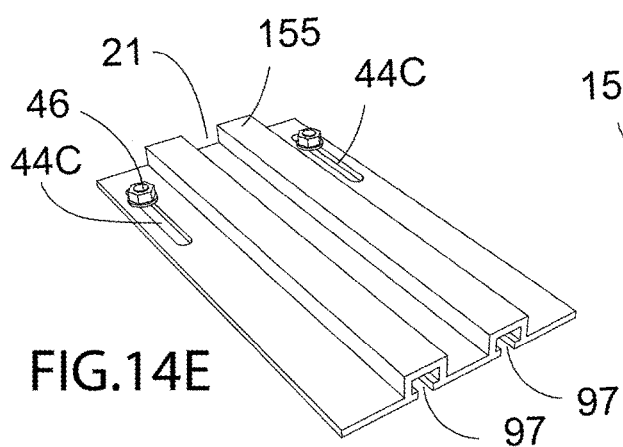
FIG. 14E is a perspective view of the extrusion illustrated in FIG. 14D.
Figure 14F:
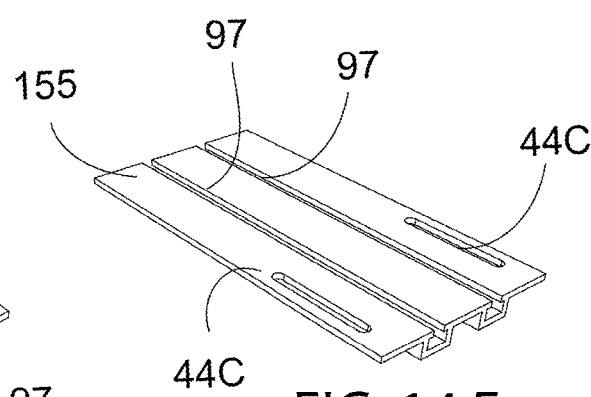
FIG. 14F is a perspective view of the extrusion illustrated in FIG. 14E from the opposite side.

FIG. 14A is a perspective view of a miter saw 19 positioned on a folding miter saw stand 23. The miter saw is fitted with the T-slot extension table 138. The portable miter slot extrusion 30 is designed to hold a miter bar pocket hole jig on a flat surface such as a table or an auxiliary miter saw stand. The KREG drill guide miter bar system 100 is locked into the portable miter slot extrusion 30. FIG. 14B is an enlarged view of 14A illustrating the KREG drill guide miter bar system 100 which is locked into the portable miter slot 30 with the example miter bar locking mechanism 67. The portable miter slot extrusion 30 is secured to the auxiliary miter saw table 138 with a bolt and nut 46 that protrudes through the slot 44C in the extrusion. The workpiece 14 abuts a flip stop 160 that is secured to the L-shaped top track 65. FIG. 14C is an enlarged exploded perspective view of the example portable miter slot extrusion 30 adapted to support the KREG drill guide pocket hole system 100. The miter bar 96 is aligned with the miter slot opening 171 in the portable miter slot extrusion 30 and may be adjusted and secured via the locking mechanism 67 as described herein. FIGS. 14D, 14E, and 14F depicted another example of an improved portable miter slot 155. A T-slot 97 is positioned on each side of the miter slot opening 21. This enhanced design also allows the portable miter slot extrusion 155 to be secured to a workbench by using the T-slots 97. For instance, bolt heads may fit into the T-slot track opening 97 and in the auxiliary miter saw table 138, or a bolt may be secured to a worksurface/workbench with standard hardware.

Further embodiments of the invention provide additional features to enhance woodworking devices, systems, and methods. The present KREG flip stop system does not establish secure engagement and operation. For instance, the KREG base design provides a sloppy fitment with the track and between the flip stop base and associated bolt, and the KREG flip stop arm plastic busing design also establishes a slack engagement with diminished set screw tension adjustment. Moreover, the KREG set screw design includes oversized holes and a loose fitting plastic bushing, thus creating an imprecise fit. The example bushings described herein can be configured to slide into the oversized holes in the flip stop base and arm. Set screws in the bushing can also be configured to adjust the fit of the flip stop base and the flip arm in relationship to the bolt that holds them together. Therefore, in one embodiment, the example bushings provide an improved adjustment system and may replace the plastic loose fitting bushings of the current KREG flip stop.

The various issues with the KREG design are addressed by an example U-shaped bushing 152 described herein. FIG. 15A is a perspective view of a table saw with the KREG drill guide miter bar system 100 engaged with the example U-shaped bushing 152 of this invention and positioned on an example table saw top 92. The workpiece 14 is in contact with the KREG flip stop 85 and the KREG L-shaped track extrusion 77. The KREG flip stop 85 is touching the edge of the workpiece 14. The workpiece 14 is pressed by the KREG drill guide miter bar system 100 against the KREG L-shaped fence extrusion 77. The KREG flip stop 85 and the KREG L-shaped track extrusion 77 are disclosed in U.S. Pat. No. 7,798,187 B1.

FIG. 15B is an enlarged perspective view of the KREG flip stop 85 engaged with the example U-shaped busing 152 shown in FIG. 15A. The KREG flip stop 85 is secured to the KREG L-shaped track 77 with a knob 49B on top of the KREG stop base 105. The U-shaped bushing 152 is located between the top of the KREG track 77 and the KREG stop base 105 and is configured to receive and engage the KREG stop base 105. A flange 180 on the bottom of the bushing 152 contacts the T-slot opening 97 on the top of the KREG L-shaped track extrusion 77. FIG. 15C is a perspective view that illustrates the KREG flip stop base 105 and the U-shaped bushing 152, with the bolt 34 removed for clarity. The U-shaped bushing 152 is configured to engage and be positioned inside the oversized hole 12 in the KREG stop base 105. FIG. 15D is a perspective view that illustrates the U-shaped bushing 152. On the bottom of the bushing is the flange 180 that fits into the T-slot 97 of the KREG L-shaped track 77. The solid side of the U-shaped bushing 28 has a drilled and tapped hole 41. The open side of the bushing 152 has a round opening 151 for the example ¼-20 bolt shaft. FIG. 15E is a perspective view of the KREG flip stop base 105 and the U-shaped bushing 152 that is configured to engage with the KREG flip stop base 105. The bushing 152 fits inside of the hole opening 12 of the KREG flip stop base 105. Set screws 159 are lined up with the threaded holes in the bushing 152. One of the threaded holes 41 is illustrated in FIG. 15D.

FIG. 15F is a perspective view of the KREG flip stop arm 157 and a bushing 168 that fits inside of the hole opening to similarly address loose fitting KREG design, as described in connection with the U-shaped busing 152. The KREG flip stop arm 157 can rotate about the bolt 34. A set screw 159 is lined up with the threaded hole in the bushing 168 and provides improved operation and adjustment of the flip stop arm 157. FIG. 15G is an end section view of the U-shaped bushing 152. As noted, the U-shaped bushing 152 is designed and configured to modify/replace the oversized hole 12 and the oversized plastic bushing in the current model of the KREG flip stop 85 to establish more precise fitment and operation, with additional adjustability. Each of the two sides of the U-shaped bushing 152 can include a threaded hole 41. The solid side 28 is drilled and tapped, and slides into the smaller opening as illustrated in FIG. 15C. Again with reference to FIG. 15D, FIG. 15D is a perspective drawing of the bushing 152 and illustrates the threaded hole 41 in the middle of the solid side of the bushing 28. The open side of the bushing 152 has a circular opening 151 for the shaft of the bolt 25. FIG. 15H is an end section view of the U-shaped bushing 168 designed to slide into the flip stop arm 157 as illustrated in FIG. 15F to, again, enhance the precise fitment and operation of the flip stop arm 157. A threaded hole 41 is located in the middle of the bushing 168. FIG. 15I is an end view of the U-shaped bushing 152 and FIG. 15J is an end view of the U-shaped bushing 168.

Figure 15K:
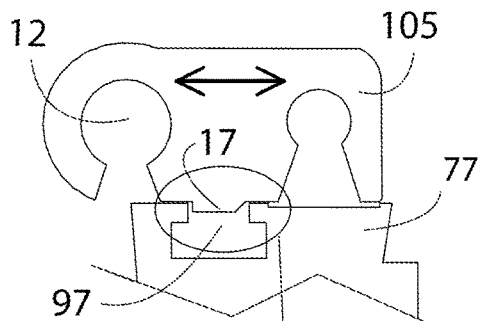
FIG. 15K is an end view of the KREG flip stop base and the KREG L-shaped track illustrating the flange that fits into the T-slot of the track.
Figure 15O:
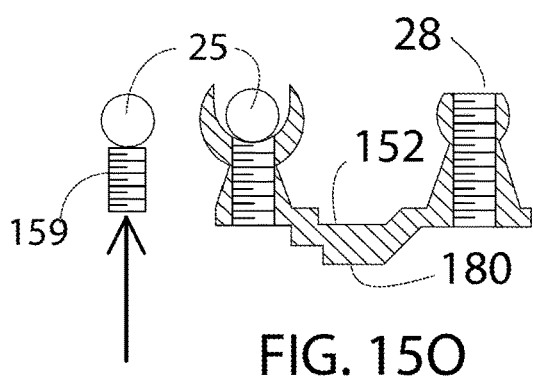
FIG. 15O is an end view of the bushing illustrating the upward force of the set screw against the shaft of the bolt. As the set screw is tightened a downward force on the bushing secures it into the oversized hole of the KREG flip stop base.
Figure 15L:
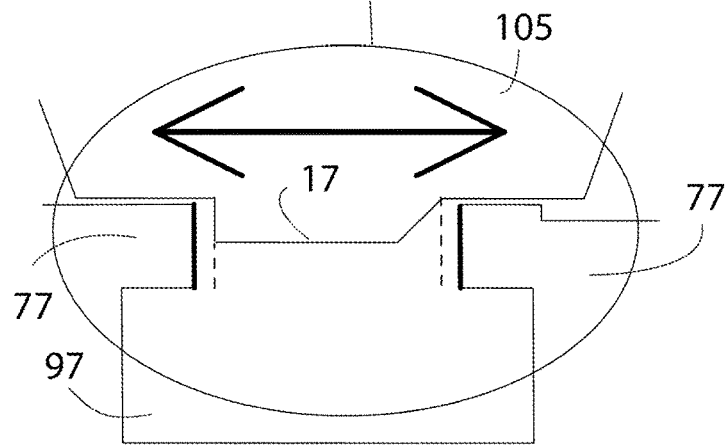
FIG. 15L is an enlarged view of a portion of FIG. 15K.
Figure 15M:
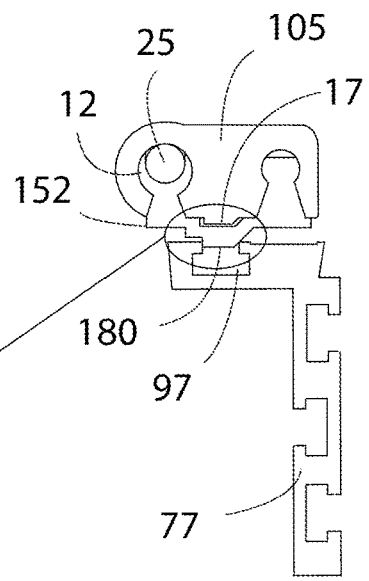
FIG. 15M is an end view of the KREG L-shaped track, the U-shaped bushing, and the KREG flip stop arm.
Figure 15N:
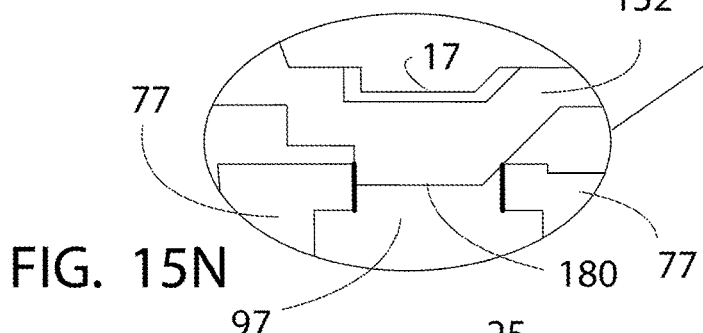
FIG. 15N is an enlarged view of a portion of FIG. 15M illustrating the close fit between the flange of the U-shaped bushing and the T-slot of the KREG L-shaped track. The T-slot opening of the KREG L-shaped track is illustrated with bold lines.
Figure 15P:
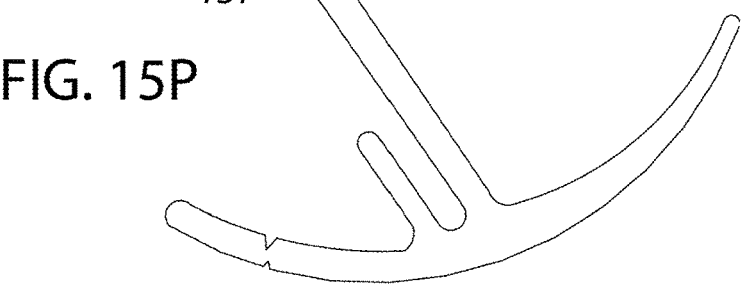
FIG. 15P is an end view of the KREG flip stop arm and the bushing.

FIG. 15K is an end view of the KREG L-shaped track 77 illustrating the flange 17 of the KREG flip stop base 105 that loosely fits into the T-slot 97 of the track 77. An arrow illustrates that the KREG flip stop base 105 can move back-and-forth in relationship to the KREG L-shaped track 77. FIG. 15L is an enlarged view of a portion of FIG. 15K. The width of the flange 17 of the KREG flip stop base 105 is represented by dotted lines. The width of the opening of the T-slot 97 in the KREG track 77 is represented with bold lines. Because the size of the flange 17 is smaller than the T-slot 97 opening, the KREG flip stop base 105 can move in relationship to the KREG L-shaped track 77 as represented by the arrow. That is, the arrow represents movement of the present KREG configuration between the KREG flip stop base 105 and the KREG L-shaped track 77. FIG. 15M is an end view of the KREG L-shaped track 77, the U-shaped bushing 152, and the KREG flip stop base 105. The U-shaped bushing 152 is positioned between KREG flip stop base 105 and the KREG L-shaped track 77 to establish enhanced fitment and operation. The U-shaped bushing 152 is located inside the oversized hole 12 of the KREG flip stop base 105. The flange 180 of the U-shaped bushing 152 fits tightly and precisely into the T-slot 97 of the KREG L-shaped track 77 to aid a secure fitment. FIG. 15N is an enlarged view of a portion of FIG. 15M illustrating the close fit between the flange 180 of the U-shaped bushing 152 and the T-slot opening 97 of the KREG L-shaped track 77. The T-slot opening 97 of the KREG L-shaped track 77 is illustrated with bold lines. The U-shaped bushing 152 and included flange 180 locks securely into the T-slot 97 of the KREG L-shaped track 77. FIG. 15O is an end view of the bushing illustrating the upward force of the set screw 159 against the shaft of the bolt 25. As the set screw 159 is tightened, a downward force on the bushing 152 secures it into the oversized hole 12 of the KREG flip stop base 105. FIG. 15P is an end view of the KREG flip stop arm 157 and the bushing 168. As described above, the example U-shaped busing 152 and the example U-shaped bushing 168 address various issues and problems with the current KREG flip stop 85 (e.g., the various issues noted above, including a sloppy fit between various components and a lack of precise adjustability).

Given the benefit of this disclosure, one skilled in the art will appreciate that various alterations and modifications may be made to the various example embodiments described herein that remain within the scope of the inventions. For instance, FIG. 16A is a perspective view of the hinge style pocket hole drill guide block illustrated in FIGS. 1A and 1B. The threaded knob has been replaced with a cam lever 108 for pushing/urging the drill guide 53 into a workpiece. FIG. 16B is an enlargement of the example cam lever 108 removed from the drill guide, showing the example contours (e.g., the offset axis of rotation). FIG. 16C is an end view of the drill guide block 53 with the cam lever 108 illustrated with a dotted line. FIG. 16D is an end view of the drill guide block 53 with the cam lever 108 illustrated with a solid line and further rotated into an engaged orientation. A pointed arrow illustrates that as the cam lever 108 is lifted, the cam action causes the drill guide block 53 to pivot about the hinge pin 52 and tilt forward toward and into the workpiece.

Embodiments of the invention are illustrated in extensive detail in the accompanying FIGS., and as set forth above in the description of the accompanying FIGS. As shown in the FIGS., jigs, fixtures, accessories, and the like for locating, aligning, guiding, engaging, and/or holding a workpiece on woodworking machinery during a woodworking operation are described, as well as methods of making, modifying, and using jigs, fixtures, and accessories.

Preferred embodiments of the invention have been described in considerable detail. Given the benefit of this disclosure, many modifications and variations to the preferred embodiments described will be appreciated by a person of ordinary skill in the art. Therefore, the invention should not be limited to the specific embodiments described.

I claim:

1. A woodworking machinery jig and fixture system, comprising:
   a miter bar pocket hole jig drill guide assembly comprising:
      a drill guide miter bar configured to engage a miter slot;
      a bracket coupled to the drill guide miter bar; and
      a drill guide coupled to the bracket;
   a miter bar head assembly;
      a head miter bar configured to engage the miter slot; and
      a miter bar head coupled to the head miter bar;
   wherein the drill guide miter bar and the head miter bar are independently positionable within the miter slot to alter a spacing between the drill guide and the miter bar head.

2. The woodworking machinery jig and fixture system of claim 1, wherein:
   the bracket comprises:
      a first bracket coupled to the drill guide miter bar; and
      a second bracket coupled to the first bracket; and
   the drill guide is coupled to the second bracket.

3. The woodworking machinery jig and fixture system of claim 2, wherein the first bracket and the second bracket define cooperating structures that allow the second bracket to be positioned at multiple locations along the first bracket in a direction perpendicular to a longitudinal axis of the drill guide miter bar.

4. The woodworking machinery jig and fixture system of claim 3, wherein:
   the cooperating structures comprise a corrugated design; and
   the first bracket and second bracket are coupled via a fastener.

5. The woodworking machinery jig and fixture system of claim 2, wherein:
   the first bracket is an L-shaped bracket; and
   the second bracket is a Z-shaped bracket.

6. The woodworking machinery jig and fixture system of claim 1, wherein the drill guide is pivotally coupled to the bracket.

7. The woodworking machinery jig and fixture system of claim 6, further comprising a hinge mechanism pivotally coupling the drill guide to the bracket.

8. The woodworking machinery jig and fixture system of claim 7, wherein:
   the hinge mechanism comprises:
      at least one hinge pin formed on the drill guide and the bracket; and
      at least one opening formed on the drill guide and the bracket; and
   the hinge pin and the opening are configured to allow the drill guide to pivot relative to the bracket.

9. The woodworking machinery jig and fixture system of claim 6, further comprising a clamping mechanism coupled with the bracket and extending from the bracket at a variable distance, wherein the clamping mechanism is configured to selectively engage the drill guide to inhibit an allowable range of pivotal rotation of the drill guide based on the variable distance of the clamping mechanism.

10. The woodworking machinery jig and fixture system of claim 9, wherein the clamping mechanism comprises at least one chosen from a handle threadably coupled to the bracket and a cam lever pivotally coupled to the bracket.

11. The woodworking machinery jig and fixture system of claim 1, further comprising:
   a drill guide miter bar locking mechanism configured to releasably restrain the drill guide miter bar at a first position within the miter slot; and
   a head miter bar locking mechanism configured to releasably restrain the head miter bar at a second position within the miter slot; and
   wherein the first position is spaced apart from the second position along a length of the miter slot.

12. The woodworking machinery jig and fixture system of claim 11, wherein at least one of the drill guide miter bar locking mechanism and the head miter bar locking mechanism comprises a slot forming split fingers in the respective drill guide miter bar and the head miter bar that are urged away from each other by an adjustable locking member positioned between the split fingers.

13. The woodworking machinery jig and fixture system of claim 1, further comprising a fixture coupled to the bracket and configured to releasably receive the drill guide, such that the drill guide is coupled to the bracket via the fixture.

14. The woodworking machinery jig and fixture system of claim 13, wherein the fixture comprises:
   a U-shaped fixture configured to receive the drill guide; and
   a fastener engaged with the U-shaped fixture and configured to selectively retain the drill guide at least partially within the U-shaped fixture.

15. A woodworking system, comprising:
   a first miter bar configured to be selectively moveable within a slot that extends from a first end to a second end;
   a miter head supported by the first miter bar;
   a second miter bar configured to be selectively moveable within the slot; and
   a drill guide supported by the second miter bar;
   wherein the first miter bar and the second miter bar are independently moveable within and relative to the first end and the second end of the slot, such that a workpiece can be positioned and secured between the miter head and the drill guide.

16. The woodworking system of claim 15, further comprising:
   a portable miter base extending from a first end to a second end and configured to be secured to a support structure near the first end; and
   wherein the portable miter base defines the slot, the slot extends from the first end to the second end to slideably receive the second miter bar.

17. The woodworking system of claim 16, wherein the slot is defined by spaced apart T-slots that extend from the first end to the second end of the portable miter base.

18. The woodworking machinery jig and fixture system of claim 1, further comprising:
   a portable miter base extending from a first end to a second end and configured to be secured to a support structure near the first end; and
   wherein the portable miter base defines the miter slot, the miter slot extends from the first end to the second end to slideably receive the drill guide miter bar.

19. The woodworking system of claim 18, wherein the miter slot is defined by spaced apart T-slots that extend from the first end to the second end of the portable miter base.

* * * * *

UNITED STATES PATENT AND TRADEMARK OFFICE
CERTIFICATE OF CORRECTION

PATENT NO. : 11,529,690 B2
APPLICATION NO. : 17/321118
DATED : December 20, 2022
INVENTOR(S) : Mark A. Duginske It is certified that error appears in the above-identified patent and that said Letters Patent is hereby corrected as shown below:

In the Specification

Column 11, Lines 4-5, "FIG. 61" should be --FIG. 6I--.

Column 11, Line 42, "FIG. 61" should be --FIG. 6I--.

Column 13, Line 7, "FIG. 81" should be --FIG. 8I--.

Column 17, Line 28, "FIG. 150" should be --FIG. 15O--.

Signed and Sealed this
Twenty-first Day of February, 2023

Katherine Kelly Vidal
*Director of the United States Patent and Trademark Office*